US012596713B2

(12) United States Patent
Badii et al.

(10) Patent No.: US 12,596,713 B2
(45) Date of Patent: *Apr. 7, 2026

(54) SYSTEMS AND METHODS FOR REDUCING THE CARDINALITY OF METRICS QUERIES

(71) Applicant: Bitdrift, Inc., San Francisco, CA (US)

(72) Inventors: Behrooz Badii, Westport, CT (US); Yann Thomas Ramin, Folsom, CA (US)

(73) Assignee: Bitdrift, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,891

(22) Filed: Sep. 23, 2024

(65) Prior Publication Data

US 2025/0086179 A1 Mar. 13, 2025

Related U.S. Application Data

(63) Continuation of application No. 18/165,927, filed on Feb. 7, 2023, now Pat. No. 12,099,507.

(51) Int. Cl.
*G06F 16/2453* (2019.01)
*G06F 16/2452* (2019.01)

(52) U.S. Cl.
CPC .... *G06F 16/24545* (2019.01); *G06F 16/2452* (2019.01)

(58) Field of Classification Search
CPC ..................... G06F 16/24545; G06F 16/2452
See application file for complete search history.

(56) References Cited

U.S. PATENT DOCUMENTS

| | | | |
|---|---|---|---|
| 11,074,256 B2 | 7/2021 | Jindal et al. | |
| 11,080,276 B2 * | 8/2021 | Wolf | G06F 16/24549 |
| 2010/0235347 A1 | 9/2010 | Chaudhuri et al. | |
| 2013/0091168 A1 | 4/2013 | Bhave et al. | |
| 2016/0034553 A1 | 2/2016 | Tong et al. | |
| 2017/0323200 A1 | 11/2017 | Corvinelli et al. | |
| 2018/0373758 A1 | 12/2018 | Obradovic et al. | |
| 2019/0197162 A1 | 6/2019 | Chiang | |
| 2019/0384765 A1 * | 12/2019 | White | G06F 16/24545 |
| 2020/0134070 A1 * | 4/2020 | Sidoti | G06F 16/24542 |
| 2020/0210387 A1 * | 7/2020 | Brown | G06N 5/04 |
| 2020/0379963 A1 * | 12/2020 | Lopes | G06F 16/24542 |
| 2021/0056108 A1 | 2/2021 | Shmueli et al. | |
| 2021/0191932 A1 * | 6/2021 | de Jong | G06F 16/2453 |
| 2021/0357403 A1 * | 11/2021 | Dash | G06F 16/24568 |
| 2022/0004553 A1 | 1/2022 | Corvinelli et al. | |
| 2022/0318243 A1 | 10/2022 | Donjerkovic et al. | |

OTHER PUBLICATIONS

International Search Report & Written Opinion as received in PCTUS2024/014686 dated Jun. 17, 2024.

* cited by examiner

*Primary Examiner* — Dangelino N Gortayo
(74) *Attorney, Agent, or Firm* — Lee Sullivan Shea & Smith LLP

(57) ABSTRACT

A computing platform may be configured to (i) perform an analysis of a saved query comprising an expression that specifies a set of one or more unique metrics for which metric data is to be fetched from a metrics management platform when the saved query is run, (ii) determine a strategy for reducing a cardinality level of the saved query based at least in part on the analysis of the saved query, and (iii) cause the saved query to be modified in accordance with the determined strategy for reducing the cardinality level of the saved query.

20 Claims, 11 Drawing Sheets

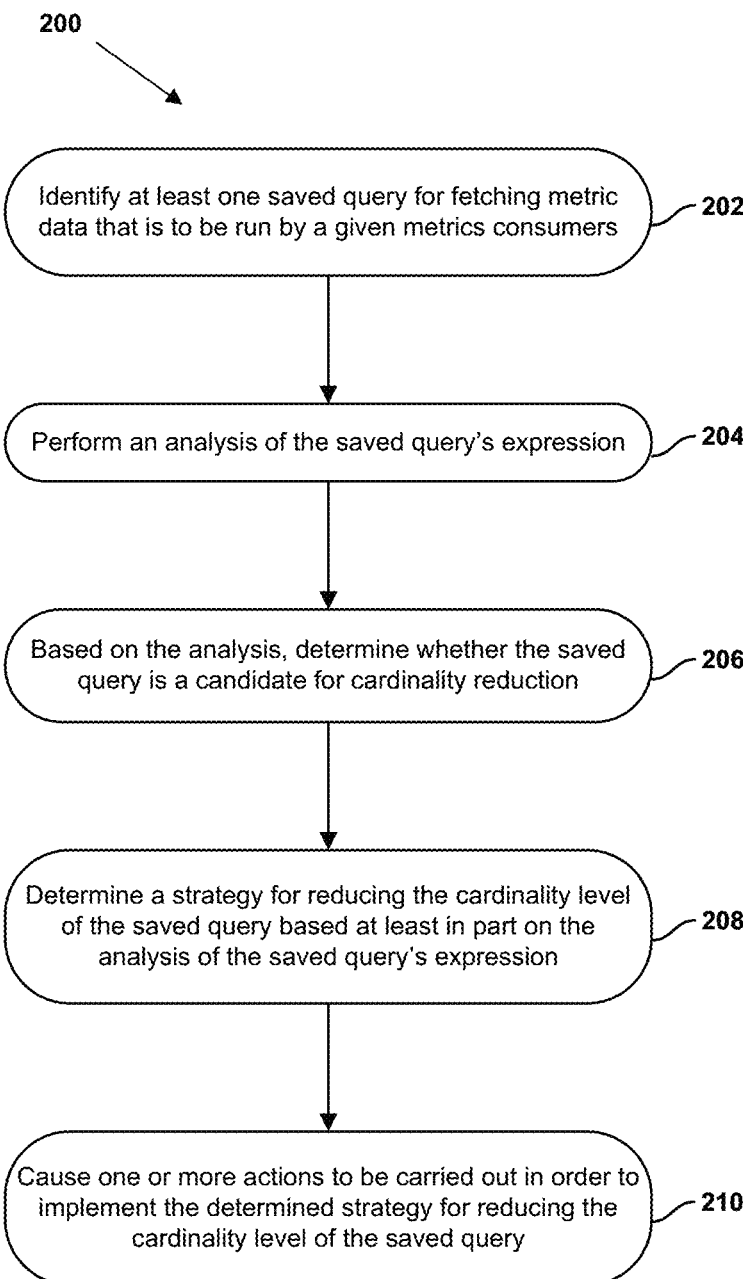

200

Identify at least one saved query for fetching metric data that is to be run by a given metrics consumers — 202

Perform an analysis of the saved query's expression — 204

Based on the analysis, determine whether the saved query is a candidate for cardinality reduction — 206

Determine a strategy for reducing the cardinality level of the saved query based at least in part on the analysis of the saved query's expression — 208

Cause one or more actions to be carried out in order to implement the determined strategy for reducing the cardinality level of the saved query — 210

FIG. 2

SYSTEMS AND METHODS FOR REDUCING THE CARDINALITY OF METRICS QUERIES

CROSS-REFERENCE TO RELATED APPLICATION

This application claims priority to, and is a continuation of, U.S. application Ser. No. 18/165,927, filed on Feb. 7, 2023, and entitled "Systems and Methods for Reducing the Cardinality of Metrics Queries," the contents of which are incorporated by reference herein in their entirety.

BACKGROUND

It is becoming increasingly common for computing devices to generate and output metric data that provides information about the state and/or performance of the computing devices. For example, a server configured to execute one or more server applications (e.g., containerized applications such as microservices) may generate and output metric data that provides information about the state and/or performance of some aspect of the server. As another example, a client device configured to execute one or more client applications (e.g., a mobile application, desktop application, web application, or the like) may generate and output metric data that provides information about the state and/or performance of some aspect of the client device. As yet another example, one computing device may generate and output metric data that provides information about the state and/or performance of some aspect of one or more other computing devices. Other examples of computing devices that generate and output metric data may exist as well.

In practice, an organization may be interested in monitoring metric data being produced by a wide array of different computing devices (e.g., servers within the organization's back-end platform, client devices running instances of a client application developed by the organization, etc.), and in order to make use of the metric data produced by these disparate software components, the organization may deploy a centralized "metrics management platform" that functions to collect and store metric data from various computing devices that are producing metric data (referred to herein as "metrics producers") so that the metric data can later be accessed and reviewed. For instance, after a metrics management platform collects and stores metric data from different metrics producers, individuals associated with the organization (e.g., developers, engineers, analysts, etc.) can review the stored metric data in order to gain visibility into the state and/or performance of the metrics producers.

SUMMARY

Disclosed herein is the new technology for reducing the cardinality of saved queries.

In one aspect, the disclosed technology may take the form of a method that involves (i) performing an analysis of a saved query comprising an expression that specifies a set of one or more unique metrics for which metric data is to be fetched from a metrics management platform when the saved query is run, (ii) determining a strategy for reducing a cardinality level of the saved query based at least in part on the analysis of the saved query, and (iii) causing the saved query to be modified in accordance with the determined strategy for reducing the cardinality level of the saved query. In some embodiments, the method may further involve, prior to determining the strategy for reducing the cardinality level of the saved query, determining that the query is a candidate for cardinality reduction based at least in part on the analysis of the saved query. This function of determining that the query is a candidate for cardinality reduction based at least in part on the analysis of the saved query may take various forms, and in some embodiments, may involve determining that the saved query can be modified to achieve some level of reduction in a number of samples that are to be fetched during a respective run of the saved query.

Further, the function of performing the analysis of the saved query may take various forms, and in some embodiments, may involve one or more of (i) evaluating how many unique metrics are specified by the saved query, (ii) evaluating how many samples are to be fetched for each unique metric specified by the saved query, or (iii) evaluating which types of operations that are applied by the saved query.

Further yet, the determined strategy for reducing the cardinality level of the saved query may take various forms.

For instance, in some embodiments, the determined strategy for reducing the cardinality level of the saved query may involve (i) defining at least one new composite metric that is to be used by the saved query, (ii) configuring the metrics management platform to begin producing and storing metric data for the at least one new composite metric based on metric data for a given subset of one or more metrics ingested by the metric management platform, (iii) modifying the saved query so that the expression of the saved query encodes a request for metric data for the at least one new composite metric, and perhaps also (iv) configuring the metrics management platform to either (a) block storage of metric data for the given subset of one or more metrics ingested by the metric management platform or (b) store metric data for the given subset of one or more metrics ingested by the metric management platform in a lower storage tier. And in such embodiments, the function of causing the saved query to be modified in accordance with the determined strategy for reducing the cardinality level of the saved query may involve (i) instructing the metrics management platform to begin producing and storing metric data for the at least one new composite metric and (ii) instructing a given metrics consumer that is to run the saved query to modify the saved query so that the expression of the saved query encodes the request for metric data for the at least one new composite metric. Additionally, in such embodiments, the function of modifying the saved query so that the expression of the saved query encodes a request for metric data for the at least one new composite metric may involve replacing an aggregation operation that is to be applied to fetched metric data for the given subset of one or more metrics with the request for metric data for the at least one new composite metric.

In other embodiments the determined strategy for reducing the cardinality level of the saved query may involve (i) defining at least one new composite metric that is to be used by the saved query, (ii) configuring the given metrics consumer to begin (a) extracting metric data for the at least one new composite metric during runs of the saved query, and (b) transmitting the extracted metric data for the at least one new composite metric to the metrics management platform for storage, and (iii) modifying the saved query so that the expression of the saved query encodes a request for metric data for the at least one new composite metric. And in such embodiments, the function of causing the saved query to be modified in accordance with the determined strategy for reducing the cardinality level of the saved query may involve (i) instructing an agent installed on the given metrics consumer to begin (i) extracting metric data for the at least one new composite metric during runs of the saved query and (ii) transmitting the extracted metric data for the at least one new composite metric to the metrics management platform for storage; and (ii) instructing the given metrics consumer to modify the saved query so that the expression of the saved query encodes the request for metric data for the at least one new composite metric.

In another aspect, the disclosed technology may take the form of a computing system comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 2 illustrates a flow diagram showing one possible example of operations that may be carried out by a query analysis engine in accordance with the present disclosure;

DETAILED DESCRIPTION

As noted above, it is becoming increasingly common for computing devices to generate and output metric data that provides information about the state and/or performance of the computing devices. For example, a server configured to execute one or more server applications (e.g., containerized applications such as microservices) may generate and output metric data that provides information about the state and/or performance of some aspect of the server. As another example, a client device configured to execute one or more client applications (e.g., a mobile application, desktop application, web application, or the like) may generate and output metric data that provides information about the state and/or performance of some aspect of the client device. As yet another example, one computing device may generate and output metric data that provides information about the state and/or performance of some aspect of one or more other computing devices. Other examples of computing devices that generate and output metric data may exist as well.

In practice, an organization may be interested in monitoring metric data being produced by a wide array of different computing devices (e.g., servers within the organization's back-end platform, client devices running instances of a client application developed by the organization, etc.), and in order to make use of the metric data produced by these disparate software components, the organization may deploy a centralized "metrics management platform" that functions to collect and store metric data from various computing devices that are producing metric data (referred to herein as "metrics producers") so that the metric data can later be accessed and reviewed. For instance, after a metrics management platform collects and stores metric data from different metrics producers, individuals associated with the organization (e.g., developers, engineers, analysts, etc.) can review the stored metric data in order to gain visibility into the state and/or performance of the metrics producers.

Figure 1:
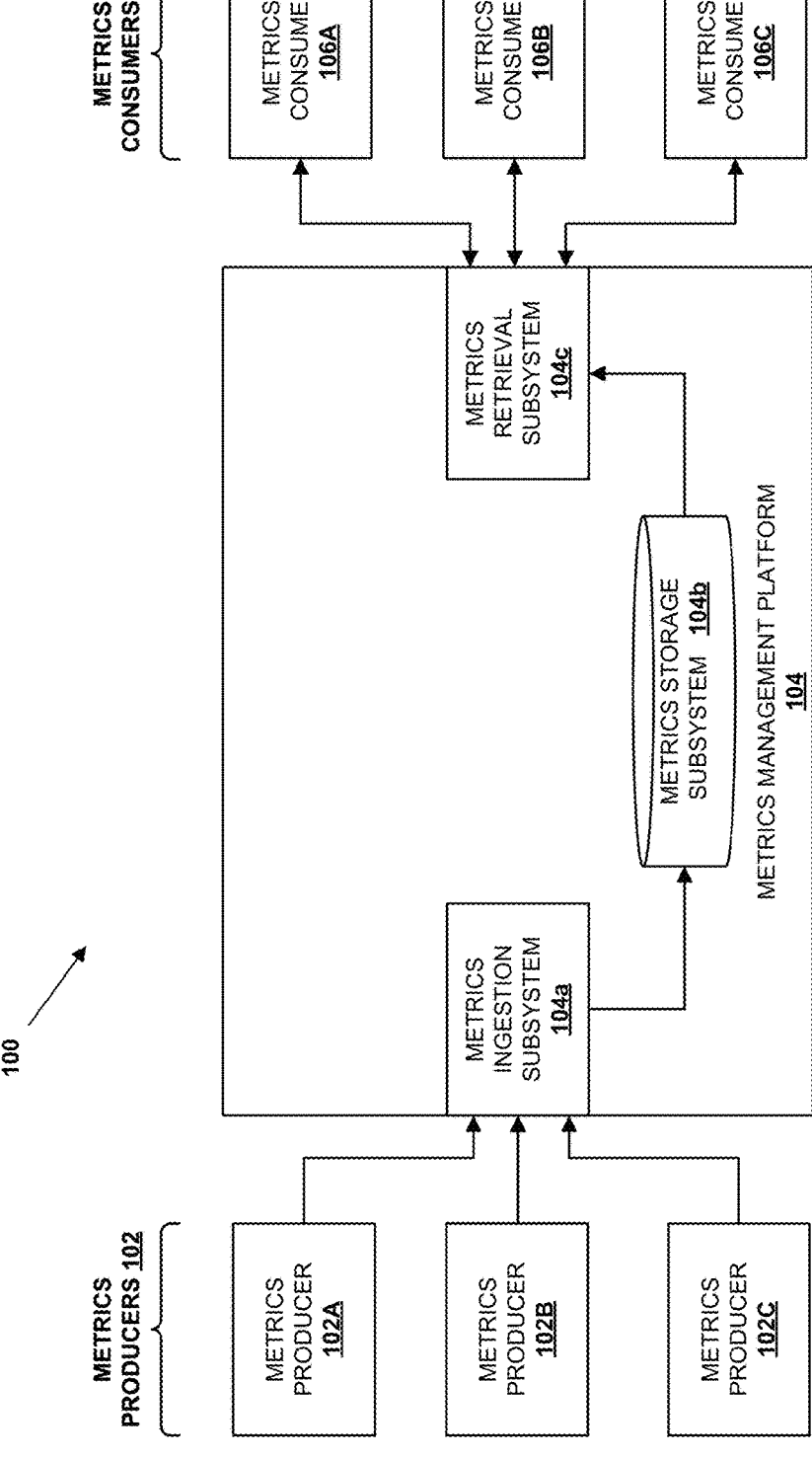
FIG. 1 illustrates an example network in which a metrics management platform may be utilized to collect and store metric data being produced by metrics producers and then make that stored metric data available to metrics consumers, in accordance with the present disclosure.

To illustrate with an example, FIG. 1 shows an example network environment 100 in which a metrics management platform may be utilized to collect and store metric data being produced by metrics producers and then make that stored metric data available to metrics consumers. As shown in FIG. 1, the network environment 100 may (i) include a number of metrics producers 102, of which three representative metrics producers 102A, 102B, and 102C are shown as examples, (ii) a metrics management platform 104, and (iii) a number of metrics consumers 106, of which three representative metrics consumers 106A, 106B, and 106C are shown as representative examples.

In general, each of the metrics producers 102 may comprise a computing device installed with software for producing metric data and transmitting such metric data to the metrics management platform 104. Such a metrics producer 102 may take any of various forms. For instance, as one possibility, a metrics producer 102 could take the form of a server configured to execute one or more server applications (e.g., containerized applications such as microservices), which may produce metric data that provides information about the state and/or performance of the server and/or the server applications running thereon. As another possibility, a metrics producer 102 could take the form of a client device configured to execute one or more client applications (e.g., a mobile application, desktop application, web application, or the like), which may produce metric data that provides information about the state and/or performance of the client device and/or the one or more client applications running thereon. As yet another example, a metrics producer 102 could take the form of a computing device that produces metric data related to the state and/or performance of one or more other computing devices and/or the software running thereon (e.g., cluster-level metric data for a cluster of nodes running containerized applications). A metrics producer 102 could take some other form as well.

Further, each of the metrics producers 102 may be configured to produce metric data for a respective set of one or more metrics, where each such metric comprises a time-series variable that provides information about the state and/or performance of some aspect of a computing device (or a collection of computing devices). Such a metric could take any of various forms.

For instance, as one possibility, a metrics producer 102 may produce metric data for a metric that provides a numerical measure of the extent of a certain type of event that has occurred at a computing device, such as a count or rate of a certain type of network request that has been received by the computing device or a count or rate of a certain type of user request that has been received by the computing device, among other possible examples. As another possibility, a metrics producer 102 may produce metric data for a metric that provides a numerical measure of the time it takes for a certain type of event to be carried out at a computing device, such as a processing or transmission duration for a certain type of network request that is handled by the computing device or a processing duration for a certain type of user request that is handled by the computing device, among other possible examples. As yet another possibility, a metrics producer 102 may produce metric data for a metric that provides a numerical measure of the extent of utilization of a certain type of resource at a computing device, such as an extent of memory utilization, CPU utilization, disk utilization, etc. at the computing device, among other possible examples. As still another possibility, a metrics producer 102 may produce metric data for a metric that provides a numerical measure of the extent of a certain type of error incurred while processing a certain type of event at a computing device, such as a count or rate of errors incurred while processing a certain type of network request or a count or rate of errors incurred while processing a certain type of user request, among other possible examples. In practice, each of the foregoing types of metrics could be produced at an application-level such that the metric reflects the state and/or performance of an individual software application running on a computing device (e.g., a particular server application or a particular client application), a device-level such that the metric reflects the state and/or performance of a computing device independent of any particular software application (e.g., a server or a client device), or a cluster-level such that the metric reflects the state and/or performance of a cluster of multiple computing devices (e.g., a cluster of multiple servers or multiple client devices), among other possibilities.

A metrics producer 102 may produce metric data for various other types of metrics as well, including but not limited to a metric that provides a numerical measure of how many instances of an item of interest (e.g., number of running containers, number of running application, etc.) exist across the network environment 100, among various other possible examples.

Further yet, in practice, a metrics producer 102 may produce metric data for each metric according to a respective sampling interval that defines the rate at which samples of the metric are to be produced by the metrics producer 102. For instance, if a metrics producer 102 is configured to produce metric data for a given metric according to a 1-minute sampling interval, the metrics producer 102 may function to produce a time series of samples for the given metric that includes a new timestamped sample of the given metric every 1 minute.

Still further, in practice, a metrics producer 102 may identify each unique metric for which it is producing metrics data in various ways. For instance, according to one possible identification scheme, a metrics producer 102 may identify each unique metric using (i) a metric name, which identifies a general type of information that is represented by the metric, and (ii) a set of one or more labels (or sometimes referred to as "dimensions") that identifies a specific instantiation of the metric name. To illustrate with a first representative example, a metric name could identify a general type of information such as total number of HTTP requests handled (e.g., http_requests_total), and the set of one or more labels could identify a particular type of HTTP request (e.g., type="400" and/or method="POST"), a particular host (e.g., host="10.2.1.1"), and/or a particular application (e.g., app="app_1") for which the total number of HTTP requests is to be captured, which defines a specific instantiation of this metric name. To illustrate with a second representative example, a metric name could identify a general type of information such as memory usage in bytes (e.g., node_memory_usage_bytes), and the set of one or more labels could identify a particular host (e.g., host="10.2.1.1") and/or a particular application (e.g., app="app_1") for which the memory usage in bytes is to be captured, which defines a specific instantiation of this metric name. Many other examples of metric names and metric labels are possible as well. Further, a metrics producer 102 may identify each unique metric for which it is producing metrics data using various other identification schemes as well, including identification schemes that use a single type of identifier.

Each of the metrics producers 102 may transmit the metric data to the metrics management platform 104 over a respective communication path. Each of these respective communication paths may generally comprise one or more data networks and/or data links, which may take any of various forms. For instance, each respective communication path between a metrics producer 102 and the metrics management platform 104 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, one example of which may include a metrics aggregation system, among other possibilities. Many other configurations are also possible.

Turning to the metrics management platform 104, as shown in FIG. 1, the metrics management platform 104 may comprise various functional subsystems, including a metrics ingestion subsystem 104a, a metrics storage subsystem 104b, and a metrics retrieval subsystem 104c, each of which may be configured to carry out certain back-end functionality of the metrics management platform 104 in accordance with the present disclosure.

For instance, the metrics ingestion subsystem 104a of the metrics management platform 104 may generally be configured to (i) receive and ingest metric data from the metrics producers 102, (ii) optionally perform certain pre-processing operations on the received metric data (e.g., validation, cleansing, deduplication, filtering, aggregation, summarization, enrichment, restructuring, reformatting, translation, mapping, etc.), and then (iii) write the ingested metric data to the metrics storage subsystem 104b, among other possible functions carried out by the metrics ingestion subsystem 104a.

Further, the metrics storage subsystem 104b of the metrics management platform 104 may generally be configured to store metric data that is received and ingested by the metrics management platform 104. In practice, the metrics storage subsystem 104b may comprise a set of one or more data stores that are configured to store metric data, where each such data store could take any of various forms, examples of which may include a NoSQL database (e.g., a time series database, columnar database, document database, key-value database, graph database, etc.), a relational database (e.g., an Online Transactional Processing (OLTP) database), a file-based data store (e.g., Hadoop Distributed File System), an object-based data store (e.g., Amazon S3, Azure Blob, etc.), a data warehouse (which could be based on one or more of the foregoing types of data stores), a data lake (which could be based on one or more of the foregoing types of data stores), a message queue, and/or a streaming event queue, among other possibilities.

In at least some implementations, the metrics storage subsystem 104b could take the form of a multi-tier storage architecture (or sometimes referred to as a "tiered" storage architecture) comprising multiple different tiers of data stores that are designed to store different classes of metric data. For instance, as one possibility, the metrics storage subsystem 104b may take the form of a multi-tier storage architecture comprising two tiers of data stores: (i) a first tier of one or more data stores that are designed to store metric data that is more frequently accessed and/or considered to be of greater importance, which is sometimes referred to as a "hot tier" of data storage, and (ii) a second tier of one or more data stores that are designed to store metric data that is less frequently accessed and/or considered to be of lesser importance, which is sometimes referred to as a "cold tier" of data storage. In this respect, the data stores in the first tier may have characteristics better suited for storage of metric data that is more frequently accessed and/or considered to be of greater importance, such as a data store that has a higher level of performance (e.g., lower latency, higher throughput, and/or greater availability, among other possible aspects of a data store's performance) and/or a lower access cost as compared to the data stores that may be used for the second storage tier but has a higher storage cost than the data stores that may be used for the second storage tier, whereas the data stores in the second tier may have characteristics better suited for storage of metric data that is less frequently accessed and/or considered to be of lesser importance, such as a data store that has a lower storage cost than the data stores that may be used for the first storage tier but perhaps has a lower level of performance (e.g., higher latency, lower throughput, and/or lesser availability, among other possible aspects of a data store's performance) and/or a higher access cost as compared to the data stores that may be used for the first storage tier, among other possible distinctions between the data stores in the first and second storage tiers.

As another possibility, the metrics storage subsystem 104b may take the form of a multi-tier storage architecture comprising three or more tiers of data stores, where each such tier is designed to store metric data having a different level of access frequency and/or a different level of importance. For instance, in line with the discussion above, the data stores in higher tiers may generally have characteristics better suited for storage of metric data that is more frequently accessed and/or considered to be of greater importance, such as data stores having a higher level of performance and/or a lower access cost but a higher storage cost, whereas the data stores in lower tiers may generally have characteristics better suited for storage of metric data that is less frequently accessed and/or considered to be of lesser importance, such as data stores having a lower storage cost but a lower level of performance and/or a higher access cost. Some representative examples of multi-tier storage architectures having three or more storage tiers include those employed by cloud-based storage services such as Amazon Web Services (AWS) (e.g., multiple different S3 tiers), Google Cloud (e.g., standard, nearline, coldline, and archive tiers), and Microsoft Azure (e.g., hot, cool, and archive tiers), but it will be understood that a multi-tier storage architecture having three or more storage tiers may take various other forms as well.

The metrics storage subsystem 104b may take other forms as well.

Further yet, the metrics retrieval subsystem 104c of the metrics management platform 104 may be generally configured to (i) receive requests from the metrics consumers 106 for metric data stored within the metrics storage subsystem 104b, (ii) retrieve the requested metric data from the metrics storage subsystem 104b, and (iii) return the requested metric data to the metrics consumers 106, among other possible functions carried out by the metrics retrieval subsystem 104c.

In practice, the metrics management platform 104 may comprise some set of physical computing resources (e.g., processors, data storage, etc.) utilized to implement the foregoing functional subsystems. This set of physical computing resources may take any of various forms. As one possibility, the metrics management platform 104 may comprise cloud computing resources supplied by a third-party provider of "on demand" cloud computing resources, such as Amazon Web Services (AWS), Amazon Lambda, Google Cloud, Microsoft Azure, or the like. As another possibility, the metrics management platform 104 may comprise "on-premises" computing resources of the given software provider (e.g., servers owned by the given software provider). As yet another possibility, the metrics management platform 104 may comprise a combination of cloud computing resources and on-premises computing resources. Other implementations of the metrics management platform 104 are possible as well.

Further, in practice, the functional subsystems of the example metrics management platform 104 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning now to the metrics consumers 106, each of the metrics consumers 106 may comprise a computing device installed with software that is programmed to consume metric data from the metrics management platform 104. Such a metrics consumer 106 may take any of various forms. As one possibility, a given metrics consumer 106 may take the form of a server installed with a server application (e.g., a back-end service such as a microservice) that is configured to request and receive metric data from the metrics management platform 104. Such a server application could take any of various forms, some examples of which may include (i) a server application that drives client-side applications for presenting metric data on a dashboard, which may be referred to herein as a "dashboard engine," or (ii) a server application that analyzes metric data for purposes of determining whether to issue alerts, which may be referred to herein as an "alert engine." Further, in practice, such a server application either could be hosted by the same organization that hosts the metrics management platform 104, in which case the server application may request and receive the metric data via an internal Application Programming Interface (API) (or the like) of the organization, or could be hosted by a different organization than the one that hosts the metrics management platform 104, in which case the server application may request and receive the metric data via an external API (or the like) of the organization hosting the metrics management platform 104, among various other possibilities. As another possibility, a given metrics consumer 106 may take the form of a client device installed with a client application that is configured to request and receive metric data from the metrics management platform 104 via an external API (or the like) of the organization hosting the metrics management platform 104. A given metrics consumer 106 may take other forms as well.

Further, each of the metrics consumers 106 may be configured to communicate with the metrics management platform 104 over a respective communication path that may generally comprise one or more data networks and/or data links, which may take any of various forms. For instance, each respective communication path between a metrics consumer 106 and the metrics management platform 104 may include any one or more of PANs, LANs, WANs such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, one example of which may include a metrics aggregation system, among other possibilities. Many other configurations are also possible.

In the network environment 100 of FIG. 1, certain of the metrics consumers 106 may be configured to run saved queries that cause the metrics consumers 106 to fetch the metric data from the metrics management platform 104. For example, a dashboard engine may be configured to periodically run a saved query according to some refresh interval that defines that rate at which the dashboard engine is to run saved query (e.g., every 5 minutes, every 30 minutes, etc.), which may then enable the dashboard engine to present the results of the saved query to a user via a client-side dashboard. As another example, an alert engine may be configured to periodically run a saved query according to some refresh interval that defines that rate at which the alert engine is to run saved query (e.g., every 5 minutes, every 30 minutes, etc.), which may then enable the alert engine to evaluate certain alert rules based on the results of the saved query. Other examples of metrics consumers 106 that are configured to run saved queries are possible as well.

In general, each of these saved queries may comprise an expression that (i) specifies a set of one or more metrics for which metric data is to be fetched from the metrics management platform 104 when the given query is run by the metrics consumer 106 that is configured to run the saved query, and may also (ii) specify one or more operations that are to be applied to the fetched metrics data. The one or more metrics that may be specified by such a saved query may take any of various forms—including any of the example types of metrics described above. Likewise, the one or more operations that are specified by such a saved query may take any of various forms. For instance, as one possibility, a saved query may specify an aggregation operation (e.g., avg, sum, min, max, count, etc.) that is applied to fetched samples of a single metric from multiple timepoints (e.g., samples from a given time window) or fetched samples of multiple different metrics from one or more timepoints. As another possibility, a saved query may specify a binary operation that is to be applied to fetched samples (or aggregations thereof), such as an arithmetic operation (e.g., addition, subtraction, multiplication, division, etc.), a comparison operation, or a logical operation. As yet another possibility, a saved query may specify an operation that computes a non-aggregating, derived value based on one or more fetched samples (or aggregations thereof), such as an operation that computes a rate or a derivative based on multiple fetched samples, among other possible examples. The one or more operations that are specified by such a saved query may take other forms as well.

Thus, each time a metrics consumer 106 runs such a saved query, the metrics consumer 106 may function to (i) request a given set of metric data from the metrics management platform 104, (ii) receive the given set of metric data back from the metrics management platform 104, and (iii) optionally perform one or more operations on the given set of metric data. In turn, the metrics consumer 106 may use the results of the saved query for any of various purposes. For example, if the metrics consumer 106 is a dashboard engine, the metrics consumer 106 may use the results of the saved query to populate a client-side dashboard. As another example, if the metrics consumer 106 is an alert engine, the metrics consumer 106 may use the results of the saved query to evaluate alert rules provisioned at the alert engine and then potentially issue an alert based on the saved query's results. A metrics consumer 106 could use the results of the saved query for other purposes as well.

This ability to configure metrics consumers 106 to automatically run saved queries is advantageous, because it allows the metrics consumers 106 to fetch metrics data on a periodic basis (and perhaps take some action based on that data) without requiring human intervention. However, this ability to configure metrics consumers 106 to automatically run saved queries can also lead to certain problems.

One such problem is that organizations typically do not impose any constraints on the "cardinality" of the saved queries that are to be run by metrics consumers 106, which is generally dictated by the extent of data samples that will need to be fetched during each run of the saved query, including in particular how many discrete timeseries will need to be fetched during each run of the saved query. For instance, a saved query that requires a metrics consumer 106 to fetch a larger number of discrete timeseries during each run will generally be considered to have a higher cardinality level, whereas a saved query that requires a metrics consumer 106 to fetch a smaller number of discrete timeseries during each run will generally be considered to have a lower cardinality level.

Because organizations typically do not impose any constraints on the "cardinality" of the saved queries that are to be run by metrics consumers 106, situations can arise where metrics consumers 106 become configured to run saved queries that have a high cardinality level. To illustrate with an example, if a given metrics consumer 106 is configured to run a saved query having an expression that applies an aggregation operation to samples for a set of multiple metrics (e.g., by referencing a metric name without specifying any labels) and that set includes a large number of different metrics, then the given metrics consumer 106 will be required to fetch a large number of data samples (e.g., a large number of discrete timeseries) every time the saved query is run, and the saved query will be considered to have a high cardinality level. Or to illustrate with another example, if a given metrics consumer 106 is configured to run a saved query having an expression that applies an aggregation operation to a time window of multiple samples of a given metric and that time window has a long duration, then the given metrics consumer 106 will be required to fetch a large number of data samples every time the saved query is run, and the saved query will be considered to have a high cardinality level. Other examples of saved queries having high cardinality are possible as well. Unfortunately, allowing metric consumers 106 to be configured with saved queries such as these that have high cardinality can lead to several undesirable consequences.

First, as the cardinality level of a saved query increases, the time it takes to carry out each run of the saved query typically increases as well. The primary reason for this is that a saved query having a higher cardinality level generally requires a larger number of data samples (e.g., a large number of discrete timeseries) to be fetched during each run of the saved query, which increases the time it takes for the metrics retrieval subsystem 104c of the metrics management platform 104 to locate the requested samples within the metrics storage subsystem 104b so that they can be returned to the metrics consumer 106. In this respect, a saved query having a higher cardinality level can introduce an undesirable delay in software applications that utilize the results of the saved query, such as dashboard engines and alert engines, because such applications must wait for each run of the saved query to complete before taking action based on the results of the saved query. Moreover, metrics management platforms and/or metrics consumers often impose a "timeout" period for queries that defines how long a given query operation is permitted to take before timing out (e.g., a 1-minute timeout period), and the increased time that is required to run saved queries having a higher cardinality level puts those saved queries at risk of not completing before the query timeout period expires, which would render those saved queries inoperable and disrupt the functionality the software applications that rely on such saved queries. For example, if a dashboard engine is configured to populate client-side dashboard based on a saved query that cannot complete before the query timeout period expires, that client-side dashboard will never get populated, which degrades user experience. As another example, if an alert engine is configured to evaluate an alert rule for a given type of alert based on a saved query that cannot complete before the query timeout period expires, that alert will never get triggered, which may prevent an organization from recognizing and remedying issues at the metrics producers 102 in a timely manner.

Second, when an organization's metrics management platform is hosted by a third party, there may be a retrieval cost incurred by each run of a query for fetching stored metrics data that is dependent on the number of unique metrics for which metric data is fetched during the query run, the number of discrete data samples that are fetched during the query run, or both, and in such a scenario, saved queries having higher cardinality levels are likely to increase the retrieval costs paid by the organization. This is because saved queries having higher cardinality levels are likely to cause metric data for a larger number of unique metrics to be fetched during each query run and/or cause a larger number of discrete data samples to be fetched during each query run.

Third, when there is no constraint on the cardinality level of the saved queries being run by the metrics consumers 106, the metrics management platform typically has to persistently store all ingested samples of all unique metrics that are received from the metrics producers 102 in a metrics storage subsystem that is suitable for regular querying, which increases the storage cost of the metrics management platform and may also degrade the performance of the metrics management platform (e.g., by increasing the time it takes to locate metric data within the metrics storage subsystem).

To address these and other problems, disclosed herein is technology for reducing the cardinality of saved queries for fetching metric data from a metrics management platform. One aspect of the disclosed technology takes the form of a new software component referred to herein as a "query analysis engine," which is configured to analyze whether saved queries for fetching metric data are candidates for cardinality reduction and then take action to cause the cardinality level of certain saved queries to be reduced. At a high level, the functionality of the disclosed query analysis engine may involve (i) performing an analysis of a saved query for fetching metric data that is to be run by a metrics consumer, (ii) based at least in part on the analysis, determining a strategy for reducing a cardinality level of the saved query, which may involve defining a new composite metric that is to be used by the saved query to reduce the extent of data samples (e.g., the number of discrete timeseries) fetched during runs of the saved query, and (iii) causing the determined strategy for reducing the cardinality level of the saved query to be implemented. This functionality will be described in further detail below with respect to FIGS. 2, 3A-D, and 4A-C.

The disclosed technology may achieve various improvements over existing systems for storing and querying metric data. First, by identifying saved queries that are candidates for cardinality reduction and then taking action to cause the cardinality level of the identified saved queries to be reduced, the disclosed technology may decrease the time it takes to complete the identified saved queries and thereby reduce the risk that the identified saved queries will timeout before completing. Second, by identifying saved queries that are candidates for cardinality reduction and then taking action to cause the cardinality level of the identified saved queries to be reduced, the disclosed technology may decrease the retrieval cost incurred during runs of the saved queries. Third, by identifying saved queries that are candidates for cardinality reduction and then taking action to cause the cardinality level of the identified saved queries to be reduced, the disclosed technology may enable the metrics management platform to employ a modified storage strategy whereby metric data for ingested metrics that are not being utilized by any saved queries can either be blocked from storage or stored in a different storage tier, which may reduce the storage cost of the metrics management platform. The disclosed technology may achieve other improvements over existing systems for storing and querying metric data as well.

FIG. 2 illustrates a flow diagram 200 showing one possible example of operations that may be carried out by the disclosed query analysis engine in accordance with the present disclosure.

Beginning at block 202, the query analysis engine may identify at least one saved query for fetching metric data that is to be run by a given metrics consumer. Such a saved query could take various forms, examples of which may include a saved query for fetching metric data that is scheduled to be run on a recurring basis by a dashboard engine or an alert engine installed on the given metrics consumer or a saved query that is stored at the given metrics consumer and is available to be run "on demand" at the request of a user, among other possibilities.

In line with the discussion above, the saved query that is identified may comprise an expression that (i) specifies a set of one or more metrics for which metric data is to be fetched from a metrics management platform when the saved query is run by the given metrics consumer, and that may also (ii) specify one or more operations that are to be applied to the fetched metrics data. The one or more metrics that may be specified by the saved query may take any of various forms—including any of the example types of metrics described above (e.g., a metric that provides a numerical measure of the extent of a certain type of event that has occurred at a computing device, the time it takes for a certain type of event to be carried out at a computing device, the extent of utilization of a certain type of resource at a computing device, the extent of a certain type of error incurred while processing a certain type of event at a computing device, etc.). Likewise, the one or more operations that may be specified by such a saved query may take any of various forms—including any of the example types of operations described above (e.g., an aggregation operation, a binary operation, an operation that computes a non-aggregating, derived value, etc.).

Further, in line with the discussion above, the saved query that is identified will have an associated cardinality level, which is primarily dictated by how many data samples (e.g., how many discrete timeseries) will need to be fetched during each run of the saved query. For instance, if the saved query causes the given metrics consumer to fetch a larger number of data samples (e.g., a larger number of discrete timeseries) during each run, the saved query may be considered to have a higher cardinality level, whereas if the saved query causes the metrics consumer to fetch a smaller number of data samples (e.g., a smaller number of discrete timeseries) during each run, the saved query may be considered to have a lower cardinality level.

The saved query that is identified may take other forms as well.

At block 204, the query analysis engine may then perform an analysis of the saved query's expression that facilitates a determination of (i) whether the saved query is a candidate for cardinality reduction and (ii) if so, how the saved query's cardinality level can be reduced. This analysis of the saved query's expression may take various forms.

As one possible implementation, the query analysis engine may begin its analysis of the saved query's expression by evaluating how many unique metrics are specified by the saved query. In order to perform this evaluation, the query analysis engine may be configured with the capability to interpret notations utilized by certain query languages (e.g., PromQL, SQL, etc.) to reference unique metrics, and the query analysis engine may also have access to a listing of all metrics that have been ingested by the metrics management platform, which may be utilized to facilitate the query analysis engine's determination of how many unique metrics are specified by the saved query.

For instance, in a scenario where the metrics ingested by the metrics management platform are identified using metric names and corresponding sets of one or more labels, it is possible that the saved query may reference a set of unique metrics by referencing a metric name without specifying any corresponding label, which amounts to a request to fetch samples for all unique metrics having that same metric name. To illustrate with an example, if there is a set of unique metrics that are identified by the metric name http_requests_total and a corresponding set of two labels, type and host, a reference to http_requests_total without any corresponding labels amounts to a request to fetch samples of all of the ingested metrics having the metric name http_requests_total. Or along similar lines, it is possible that the saved query may reference a set of unique metrics by referencing a metric name and specifying a value for only one of multiple possible labels corresponding to the metric name, which amounts to a request to fetch samples for all unique metrics having that same combination of metric name and label value. To illustrate with an example, if there is a set of unique metrics that are identified by the metric name http_requests_total and a corresponding set of two labels, type and host, a reference to http_requests_total{type="400"} amounts to a request to fetch samples of all of the ingested metrics having the metric name http_requests_total and a type value of 400 across all possible host values. Thus, if the query analysis engine identifies this notation within the saved query's expression, the query analysis engine may evaluate the saved query's expression against a listing of all metrics that have been ingested by the metrics management platform in order to determine how many unique metrics are being specified by the saved query.

The query analysis engine's evaluation of how many unique metrics are specified by the saved query could take various other forms as well.

In addition to evaluating how many unique metrics are specified by the saved query, the query analysis engine may also evaluate how many discrete samples are to be fetched for each unique metric specified by the saved query. In order to perform this evaluation, the query analysis engine may be configured with the capability to interpret notations utilized by certain query languages (e.g., PromQL, SQL, etc.) to reference multiple samples of a given metric, and the query analysis engine may also have access to data indicating the sampling intervals of all metrics that have been ingested by the metrics management platform, which may be utilized to facilitate the query analysis engine's determination of how many discrete samples are to be fetched for each unique metric specified by the saved query.

For instance, if the saved query specifies a given metric using the PromQL notation of <metric_identifier>[<duration>], this amounts to a request for all samples of the given metric having timestamps that fall within a lookback window having the specified duration back from the run time of the saved query. To illustrate with an example, if the saved query includes the notation http_requests_total{type="400", host="10.2.1.1"}[5 m], this amounts to a request for all samples of the http_requests_total{type="400", host="10.2.1.1"} metric from a lookback window that extends 5 minutes back from the run time of the saved query. Thus, if the query analysis engine identifies this notation within the saved query's expression, the query analysis engine access data indicating the sampling interval of the specified metric and then utilize the specified duration of the lookback window and the specified metric's sampling interval to determine the number of discrete samples that are to be fetched for each unique metric specified by the saved query.

Along with evaluating how many unique metrics are specified by the saved query and how many unique metrics are specified by the saved query, the query analysis engine may further evaluate the types of operations that are applied to fetched metric data for the metrics specified by the saved query. In order to perform this evaluation, the query analysis engine may be configured with the capability to interpret notations utilized by certain query languages (e.g., PromQL, SQL, etc.) to specify operations that are to be applied to fetched metric data for the metrics specified by the saved query.

For instance, in line with the discussion above, the query analysis engine may be configured with the capability to identify notations for aggregation operations (e.g., avg, sum, min, max, count, etc.), binary operations (e.g., arithmetic operations, comparison operations, logical operations, etc.), and/or operations that compute non-aggregating, derived values, among various other possible types of operations that may be applied to fetched metric data. To illustrate with an example, if the saved query includes the notation sum (http_requests_total), the query analysis engine may identify this to be an aggregation option that computes a sum of the most-recent sample of every metric having the metric name http_requests_total. Or to illustrate with another example, if the saved query includes the notation avg_over_time (http_requests_total{type="400", host="10.2.1.1"}[5 m]), the query analysis engine may identify this to be an aggregation option that computes an average of the samples of the http_requests_total{type="400", host="10.2.1.1"} metric from a lookback window that extends 5 minutes back from the run time of the saved query. Many other examples are possible as well.

The query analysis engine's analysis of the saved query's expression may take various other forms as well.

At block 206, based on the analysis perform at block 204, the query analysis engine may next determine whether the saved query is a candidate for cardinality reduction. At a high level, this function may involve determining whether any aspect of the saved query's expression can be modified to reduce the extent of samples (e.g., the number of discrete timeseries) that are to be fetched during each run of the saved query, which may in turn reduce the cardinality level of the saved query.

For instance, if the saved query specifies an operation that is to be applied to multiple fetched samples in order to compute a single derived value—such as an aggregation operation that computes an aggregated value from multiple fetched samples or an operation that computes a non-aggregating, derived value from multiple fetched samples—the query analysis engine may determine that the saved query is a candidate for cardinality reduction because the specified operation could be replaced by a notation that relies on a new composite metric and thereby requires a smaller number of samples to be fetched during each run of the saved query.

The query analysis engine's determination of whether any aspect of the saved query's expression can be modified to reduce the extent of samples (e.g., the number of discrete timeseries) that are to be fetched during each run of the saved query may take other forms as well.

In some implementations, as long as the query analysis engine determines that the saved query can be modified to achieve some level of reduction in the extent of samples (e.g., the number of discrete timeseries) that are to be fetched during each run of the saved query, the query analysis engine may determine that the saved query is a candidate for cardinality reduction and then proceed to block 208. On the other hand, in other implementations, the query analysis engine may additionally evaluate the extent of the cardinality reduction that could be achieved by modifying the saved query before determining whether the saved query is a candidate for cardinality reduction. For example, if the query analysis engine determines that the extent of samples (e.g., the number of discrete timeseries) that are to be fetched during each run of the saved query can only be reduced by a smaller amount that falls below a threshold, the query analysis engine may determine that the saved query is not a candidate for cardinality reduction and then leave the saved query unmodified, whereas if the query analysis engine determines that extent of samples (e.g., the number of discrete timeseries) that are to be fetched during each run of the saved query can be reduced by an amount that exceeds the threshold, the query analysis engine may determine that the saved query is a candidate for cardinality reduction and then proceed to block 208.

The query analysis engine's functionality for determining whether the saved query is a candidate for cardinality reduction may also take other forms—including but not limited to the possibility that the query analysis engine may optionally be configured to perform an initial assessment of whether the cardinality level of the saved query is within acceptable limits and then decide whether to proceed further based on that initial assessment.

Turning to block 208, if the saved query is determined to be a candidate for cardinality reduction, the query analysis engine may next determine a strategy for reducing the cardinality level of the saved query based at least in part on the analysis of the saved query's expression. In this respect, the strategy that is determined for reducing the cardinality level of the saved query may take any of various forms, which may depend on the particular embodiment of the disclosed technology and particular expression of the saved query, among other possible factors.

For instance, according to a first embodiment of the disclosed technology, a metrics management platform may be provisioned with a configurable engine that is capable of performing certain pre-processing operations on metric data that is ingested by the metric management platform prior to such metric data being stored, which may be referred to herein as a "metrics pre-processing engine." And in this first embodiment, the determined strategy for reducing the cardinality of the saved query may involve (i) defining at least one new composite metric that is to be used by the saved query as a means for reducing the extent of samples (e.g., the number of discrete timeseries) that are to be fetched during each run of the saved query, (ii) configuring the metrics pre-processing engine to begin producing samples for the at least one new composite metric, and (iii) modifying the saved query's expression so that it encodes a request for metric data for the at least one new composite metric in place of some portion of the original expression.

To illustrate with an example, if the saved query's expression encodes an aggregation operation that is to be applied to multiple unique metrics, the determined strategy for reducing the cardinality of the saved query may involve (i) defining a new composite metric that comprises an aggregation of the multiple unique metrics, (ii) configuring the metrics pre-processing engine to begin producing values for the new composite metric, and (iii) modifying the saved query's expression to replace the aggregation operation as applied to the multiple unique metrics with the request for metric data for the composite metric. Or to illustrate with another example, if the saved query's expression encodes an aggregation operation that is to be applied to a time window of multiple samples of a given metric, the determined strategy for reducing the cardinality of the saved query may involve (i) defining a new composite metric that comprises an aggregation of the time window of multiple samples of a given metric, (ii) configuring the metrics pre-processing engine to begin producing samples for the new composite metric, and (iii) modifying the saved query's expression to replace the aggregation operation as applied to the time window of multiple samples of a given metric with the request for metric data for the composite metric. Many other examples are possible as well.

Further, in the first embodiment of the disclosed technology, the determined strategy may also optionally involve modifying how metric data for certain ingested metrics is handled by the metrics management platform, such as by configuring the metrics pre-processing engine to either block metric data for certain metrics from being persistently stored in the metrics storage subsystem or store metric data for certain metrics in a lower storage tier of the metrics storage subsystem. For instance, if the determined strategy for reducing the cardinality of the saved query involves replacing the saved query's reference to one or more ingested metrics with a reference to a new composite metric, the query analysis engine may further function to (i) evaluate whether the one or more ingested metrics are being utilized by any other saved query for fetching metrics data from the metrics management platform, and (ii) if any of the one or more ingested metrics is not being utilized by any other saved query, configuring the metrics pre-processing engine to either block metric data for the ingested metric from being persistently stored in the metrics storage subsystem or store metric data for the ingested metric in a lower storage tier of the metrics storage subsystem. In this way, the disclosed technology may additionally provide a means for reducing the volume of metric data stored by the metrics management platform (or at least reducing the volume of metric data stored in a higher storage tier of the metrics management platform), which may in turn decrease storage cost and/or improve the retrieval performance of the metrics management platform.

Turning to a second embodiment of the disclosed technology, metrics consumers that are configured to run saved queries could each be provisioned with a configurable agent that is capable of extracting samples of a new composite metric during runs of a saved query and causing the samples of the composite metric to be transmitted back to the metric management platform for storage, which may be referred to herein as "query processing agent." And in this second embodiment, the determined strategy for reducing the cardinality level of the saved query may involve (i) defining at least one new composite metric that is to be used by the saved query as a means for reducing the extent of samples (e.g., the number of discrete timeseries) that are to be fetched during each run of the saved query, (ii) configuring the query processing agent to begin extracting samples of the at least one new composite metric during runs of the saved query and transmitting such samples back to the metrics management platform for storage, and (iii) modifying the saved query's expression so that it encodes a request for metric data for the at least one new composite metric in place of some portion of the original expression.

To illustrate with another example, if the saved query's expression encodes an aggregation operation that serves to aggregate multiple unique metrics at multiple different timepoints, the determined strategy for reducing the cardinality of the saved query may involve (i) defining a new composite metric that comprises an aggregation of the multiple unique metrics, (ii) configuring the query processing agent to begin extracting values for the new composite metric during runs of the saved query and transmitting such samples back to the metrics management platform for storage, and (iii) modifying the saved query's expression so that instead of aggregating multiple unique metrics at multiple different timepoints, the expression aggregates samples of the new composite metric at the multiple different timepoints. Many other examples are possible as well.

The determined strategy for reducing the cardinality of the saved query may take various other forms as well, and further examples are described below with reference to FIGS. 3A-D and FIGS. 4A-C.

Lastly, at block 210, the query analysis engine may cause one or more actions to be carried out in order to implement the determined strategy for reducing the cardinality level of the saved query. The actions that may be carried out in order to implement the determined strategy may take various forms, which may depend on the embodiment of the disclosed technology.

For instance, in the first embodiment of the disclosed technology, the query analysis engine may cause the determine strategy to be implemented by (i) instructing the metrics pre-processing engine to begin producing and writing samples for the at least one new composite metric and (ii) instructing the given metrics consumer to modify the saved query in accordance with the determined strategy. In turn, the metrics pre-processing engine may thereafter begin to produce and write samples for the at least one new composite metric, and the given metrics consumer may thereafter begin running the modified version of the saved query.

Further, in the second embodiment, the query analysis engine may cause the determine strategy to be implemented by (i) instructing the query processing agent to begin extracting samples for the at least one new composite metric and transmitting such samples back to the metrics management platform for storage and (ii) instructing the given metrics consumer to modify the saved query in accordance with the determined strategy. In turn, the query processing agent may begin to extract and send samples for the at least one new composite metric, and the given metrics consumer may begin running the modified version of the saved query.

The one or more actions that the query analysis engine may carry out in order to implement the determined strategy may take other forms as well, and further examples are described below with reference to FIGS. 3A-D and FIGS. 4A-C.

Figure 3A:
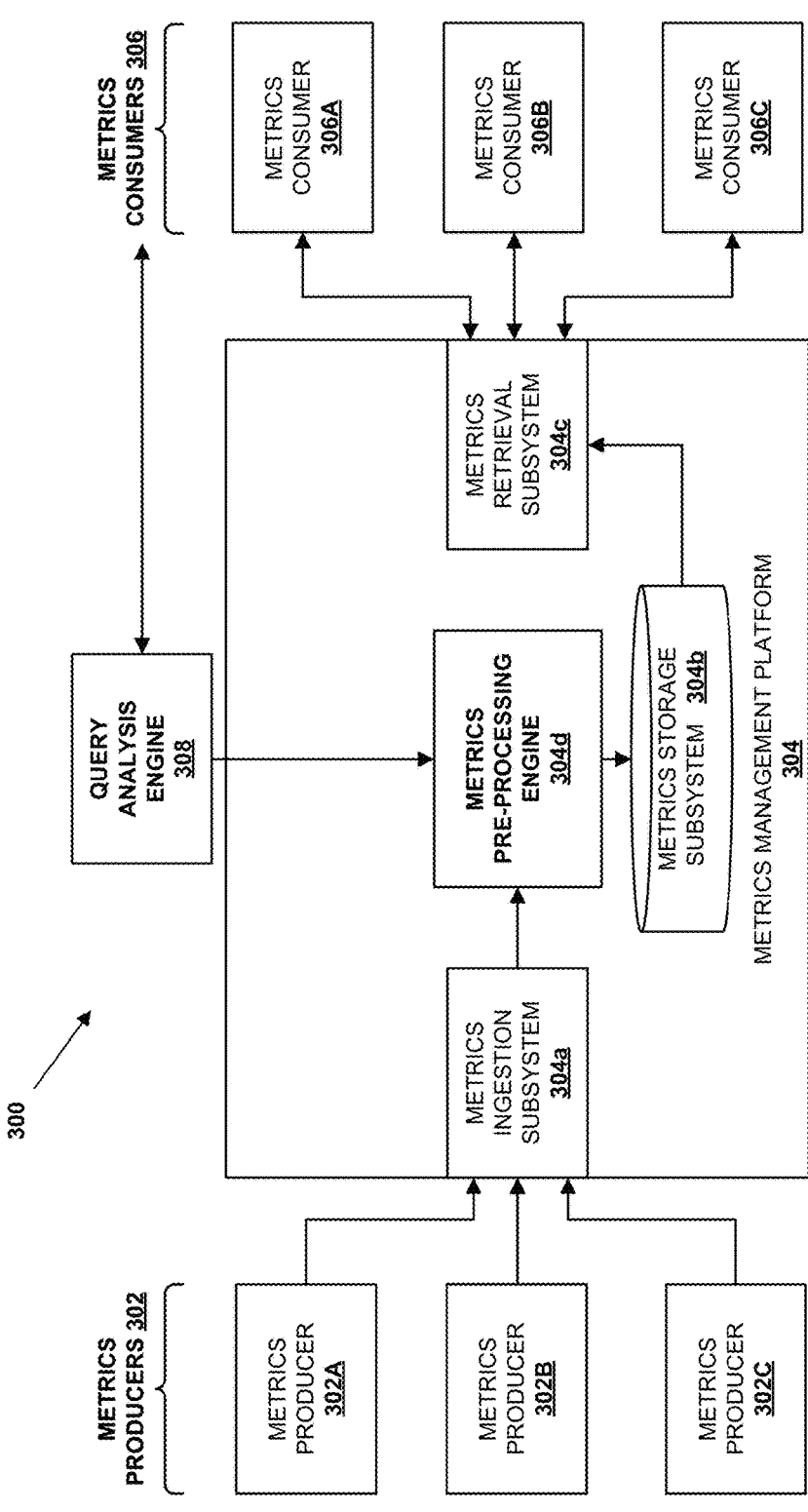
FIG. 3A illustrates a network environment in which a first embodiment of the disclosed technology has been implemented.

Turning now to FIG. 3A, a network environment 300 in which the first embodiment of the disclosed technology has been implemented is illustrated. As with the network environment 100 of FIG. 1, the network environment 300 includes (i) a plurality of metrics producers 302, of which metrics producers 302A, 302B, and 302C are shown as examples, (ii) a metrics management platform 304 comprising a metrics ingestion subsystem 304*a*, a metrics storage subsystem 304*b*, and a metrics retrieval subsystem 304*c*, and (iii) a plurality of metrics consumers 306, of which metrics consumers 306A, 306B, and 306C are shown as examples. However, unlike the network environment 100 of FIG. 1, the network environment 300 of FIG. 3 further includes (i) a metrics pre-processing engine 304*d* within the metrics management platform 304 that sits between the metrics ingestion subsystem 304*a* and the metrics storage subsystem 304*b* and (ii) a query analysis engine 308 that is configured to interact with metrics consumers 306 that are configured to run queries as well as with the metrics pre-processing engine 304*d*. (While the query analysis engine 308 is shown in FIG. 3 as a separate system from the metrics management platform 304, it should be understood that the query analysis engine 308 could also be implemented as a functional subsystem of the metrics management platform 304).

In accordance with the present disclosure, the query analysis engine 308 may be configured to analyze saved queries that are to be run by one or more of the metrics consumers 306 in order to determine whether any of the saved queries are candidates for cardinality reduction. And for each saved query that is determined to be a candidate for cardinality reduction, the query analysis engine 308 may determine a strategy for reducing the saved query's cardinality level based on its analysis and then cause the determined strategy to be implemented by (i) defining at least one new composite metric that is used by the saved query as a means for reducing the extent of samples (e.g., the number of discrete timeseries) that are to be fetched during each run of the saved query, (ii) instructing the metrics pre-processing engine 304*d* to begin producing values for the at least one new composite metric, and (iii) instructing the given metric consumer 306 that is configured to run the saved query to modify the saved query's expression so that it encodes a request for metric data for the at least one new composite metric in place of some portion of the original expression. In turn, the metrics pre-processing engine 304*d* may thereafter function to produce and write values for the at least one new composite metric, and the given metric consumer 306 may thereafter function to run the modified version of the saved query, which may involve fetching metric data for the at least one new composite metric instead of metric data for one or more ingested metrics.

Additionally, in some implementations, the determined strategy for reducing a saved query's cardinality level may further involve modifying how a corresponding set of two or more ingested metrics are handled by the metrics management platform 304, such as by configuring the metrics pre-processing engine 304*d* to either block metric data for certain ingested metrics from being persistently stored in the metrics storage subsystem 304*b* or to store metric data for certain ingested metrics in a lower storage tier of the metrics storage subsystem 304*b*, in which case the query analysis engine's functionality for causing the determined strategy to be implemented may further involve instructing the metrics pre-processing engine 304*d* to begin performing such a modified handling action with respect to metric data for the corresponding set of two or more ingested metrics. For instance, if the determined strategy for reducing the cardinality of the saved query involves replacing the saved query's reference to one or more ingested metrics with a reference to a new composite metric, the query analysis engine 308 may further function to (i) evaluate whether the one or more ingested metrics are being utilized by any other saved query for fetching metrics data from the metrics management platform, and (ii) if any of the one or more ingested metrics is not being utilized by any other saved query, configuring the metrics pre-processing engine 304*d* to either block metric data for the ingested metric from being persistently stored in the metrics storage subsystem or store metric data for the ingested metric in a lower storage tier of the metrics storage subsystem. In this way, the disclosed technology may additionally provide a means for reducing the volume of metric data stored in the metrics storage subsystem 304*b* (or at least reducing the volume of metric data stored in a higher storage tier of the metrics storage subsystem 304*b*), which may in turn decrease storage cost and/or improve the retrieval performance of the metrics management platform 304.

One illustrative example of the functionality that may be carried out by the query analysis engine 308 in accordance with the first embodiment of the disclosed technology will now be described with reference to FIG. 3B, which shows a scenario where (i) a plurality of the metrics producers 302 are configured to produce metric data for respective metrics having the same metric name but different respective labels and (ii) a given metrics consumer 306A is configured to run a first representative saved query 310 having an expression that applies an aggregation operation to a set of multiple different metrics (e.g., by referencing a metric name without specifying any labels), which causes the given metrics consumer to 306A to fetch metric data for every single metric in the set (e.g., every metric having the same metric name) every time the saved query 310 is run.

Figure 3B:
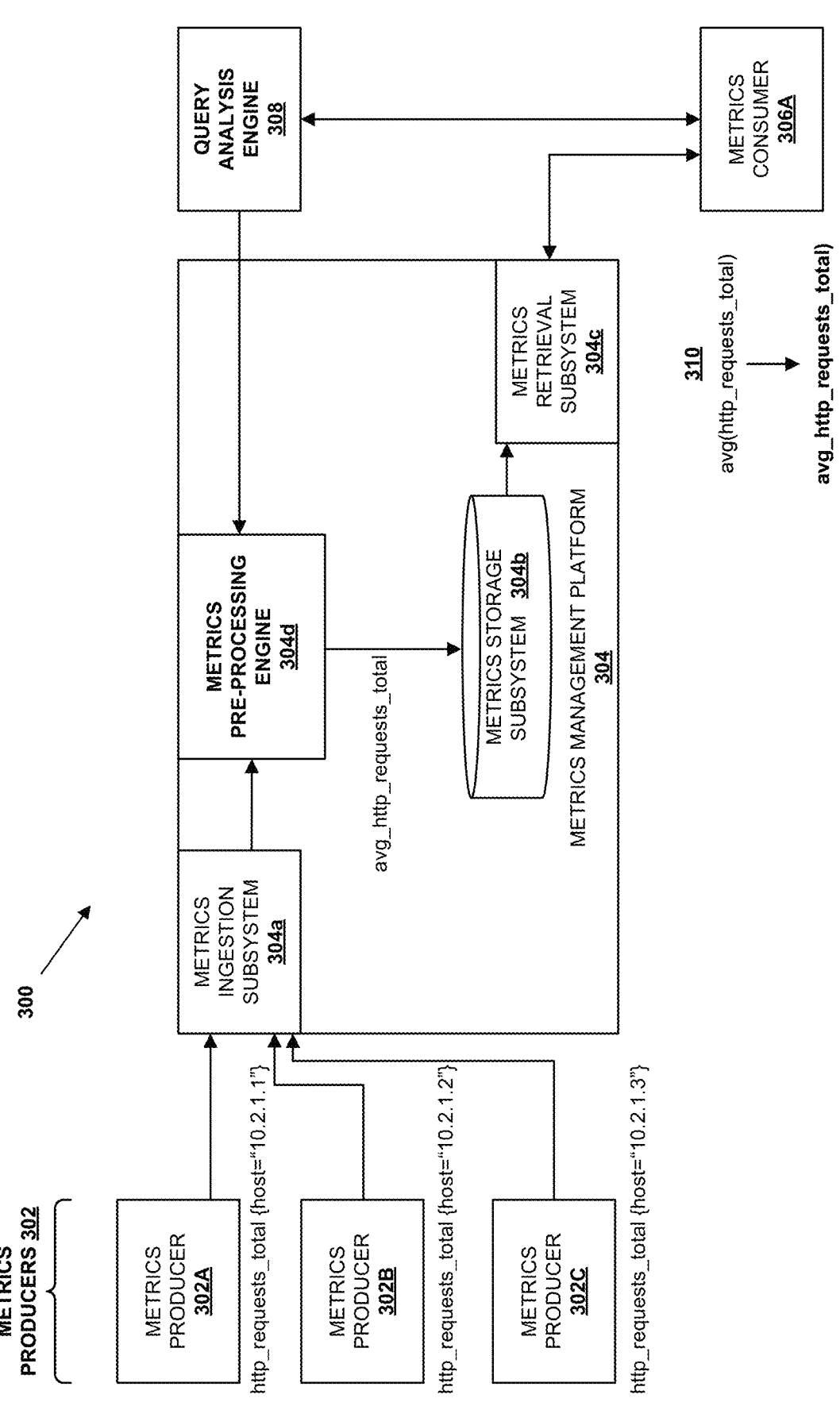
FIG. 3B illustrates one example of the functionality that may be carried out by the query analysis engine in accordance with the first embodiment of the disclosed technology.

In particular, as shown in FIG. 3B, a plurality of the metrics producers 302 may be configured to produce metric data for metrics having a same metric name of http_requests_total but having different values for a host label. For example, metrics producer 302A is shown as producing metric data for an http_requests_total{host="10.2.1.1"} metric that indicates a total number of HTTP requests handled by a host having an IP address of "10.2.1.1," metrics producer 302B is shown as producing metric data for an http_requests_total{host="10.2.1.2"} metric that indicates a total number of HTTP requests handled by a host having an IP address of "10.2.1.2," metrics producer 302C is shown as producing metric data for an http_requests_total{host="10.2.1.3"} metric that indicates a total number of HTTP requests handled by a host having an IP address of "10.2.1.3," and so on. Further, as shown in FIG. 3B, the saved query 310 to be run by the given metrics consumer 306A may have an expression of avg(http_requests_total), which specifies that the given metrics consumer 306A is to (i) fetch a most-recent sample for every metric having a metric name of http_requests_total, and (ii) average the fetched samples together to produce a single, aggregated value representing an average of the total number of HTTP requests handled by the different hosts as of the run time of the saved query 310. Thus, in this example, the saved query's cardinality level is dependent on how many different host-level http_requests_total metrics are being produced by the metrics producers 306 in the network environment 300—when the number of hosts in the network environment 300 is smaller, the saved query's cardinality level will be lower, but as the number of hosts in the network environment 300 increases, the example saved query's cardinality level will likewise increase and may eventually reach a point that could impact negatively query performance.

In accordance with the first embodiment of the disclosed technology, the query analysis engine 308 may perform an analysis of the saved query 310 in order to determine whether the saved query 310 is a candidate for cardinality reduction, and if so, the query analysis engine 308 may determine a strategy for reducing the cardinality level of the saved query 310. For instance, in this example, the query analysis engine 308 may determine that the saved query 310 is a candidate for cardinality reduction based on its use of an aggregation operation on an unbounded set of individual metrics, and may then determine a strategy for reducing the cardinality level of the saved query 310 that involves (i) defining a new composite metric identified as avg_http_requests_total that comprises an average of the individual http_requests_total{host=<value>} metrics, which is to be used by the saved query 310 in place of the individual http_requests_total{host=<value>} metrics, (ii) configuring the metrics pre-processing engine 304*d* to begin producing and writing samples for the new avg_http_requests_total metric, and (iii) updating the expression of the saved query 310 so that it specifies the new avg_http_requests_total metric instead of the individual http_requests_total{host=<value>} metrics that form the basis for the avg_http_requests_total metric. In turn, the query analysis engine 308 may cause the determined strategy to be implemented by (i) instructing the metrics pre-processing engine 304*d* to begin producing and writing samples for a new avg_http_requests_total metric that comprises an average of the individual http_requests_total{host=<value>} metrics ingested from the metrics producers 306 and (ii) instructing the given metrics consumer 306A to modify the saved query's expression from avg(http_requests_total) to avg_http_requests_total.

In some implementations, the determined strategy for reducing the cardinality level of the saved query 310 may further involve configuring the metrics pre-processing engine 304*d* to either block metric data for the individual http_requests_total{host=<value>} metrics from being persistently stored in the metrics storage subsystem 304*b* or store metric data for the individual http_requests_total{host=<value>} metrics in a lower storage tier of the metrics storage subsystem 304*b*, in which case the query analysis engine's functionality for causing the determined strategy to be implemented may further involve instructing the metrics pre-processing engine 304*d* to begin performing such a modified handling action with respect to metric data for the individual http_requests_total{host=<value>} metrics.

After the query analysis engine 308 carries out this functionality, the metrics pre-processing engine 304*d* may function to compute a time series of samples for the avg_http_requests_total metric in accordance with a certain sampling interval (e.g., a 1-minute sampling interval), where each respective sample of the avg_http_requests_total metric is computed by averaging samples of the individual http_requests_total{host=<value>} metrics from a corresponding point in time. For example, the metrics pre-processing engine 304*d* may compute (i) a first sample $S_1$ of the composite avg_http_requests_total metric having a sample time of $T_1$ by averaging ingested samples of the individual http_requests_total{host=<value>} metrics that were produced at or near $T_1$, (ii) a second sample $S_2$ of the composite avg_http_requests_total metric having a sample time of $T_2$ by averaging ingested samples of the individual http_requests_total{host=<value>} metrics that were produced at or near $T_2$, and so on for each subsequent sample of the composite avg_http_requests_total metric. As noted above, in some implementations, the metrics pre-processing engine 304*d* may also function to either block the ingested samples of the individual http_requests_total{host=<value>} metrics from being persistently stored in the metrics storage subsystem 304*b* or store such ingested samples in a lower storage tier of the metrics storage subsystem 304*b*, so as to reduce the storage footprint of the metrics data.

Further, during each subsequent run of the modified version of the saved query 310, the given metrics consumer 306A may function to fetch a most-recent sample of the composite avg_http_requests_total metric as opposed to fetching a most-recent sample of every metric having a metric name of http_requests_total. In this respect, the cardinality level of the saved query 310 is reduced, which in turn reduces the time and compute resources required to carry out each subsequent run of the saved query 310.

The query analysis engine 308 may carry out similar functionality for other saved queries having expressions that apply an aggregation operation to multiple different metrics (e.g., metrics sharing the same metric name but having different labels), such as an avg, sum, min, max, or count operation, among other possibilities.

It should also be understood that, based on the query analysis engine's analysis of a saved query having an expression that applies an aggregation operation to multiple different metrics, the query analysis engine 308 could determine not to take an action in order to reduce the cardinality level of the saved query. For example, if the saved query's expression applies an aggregation operation to a relatively-small, bounded set of metrics, the query analysis engine 308 could determine that the cardinality level of the saved query is already within acceptable limits and thereby determine not to take an action in order to reduce the cardinality level of the saved query despite the fact that some extent of cardinality reduction could be achieved by replacing the aggregation operation with a new composite metric.

Another illustrative example of the functionality that may be carried out by the query analysis engine 308 in accordance with the first embodiment of the disclosed technology will now be described with reference to FIG. 3C, which shows a scenario where (i) a given metrics producer 302A is configured to produce metric data for a given metric and (ii) a given metrics consumer 306A is configured to run a second representative saved query 320 having an expression that applies an aggregation operation to a time window of multiple samples of the given metric.

Figure 3C:
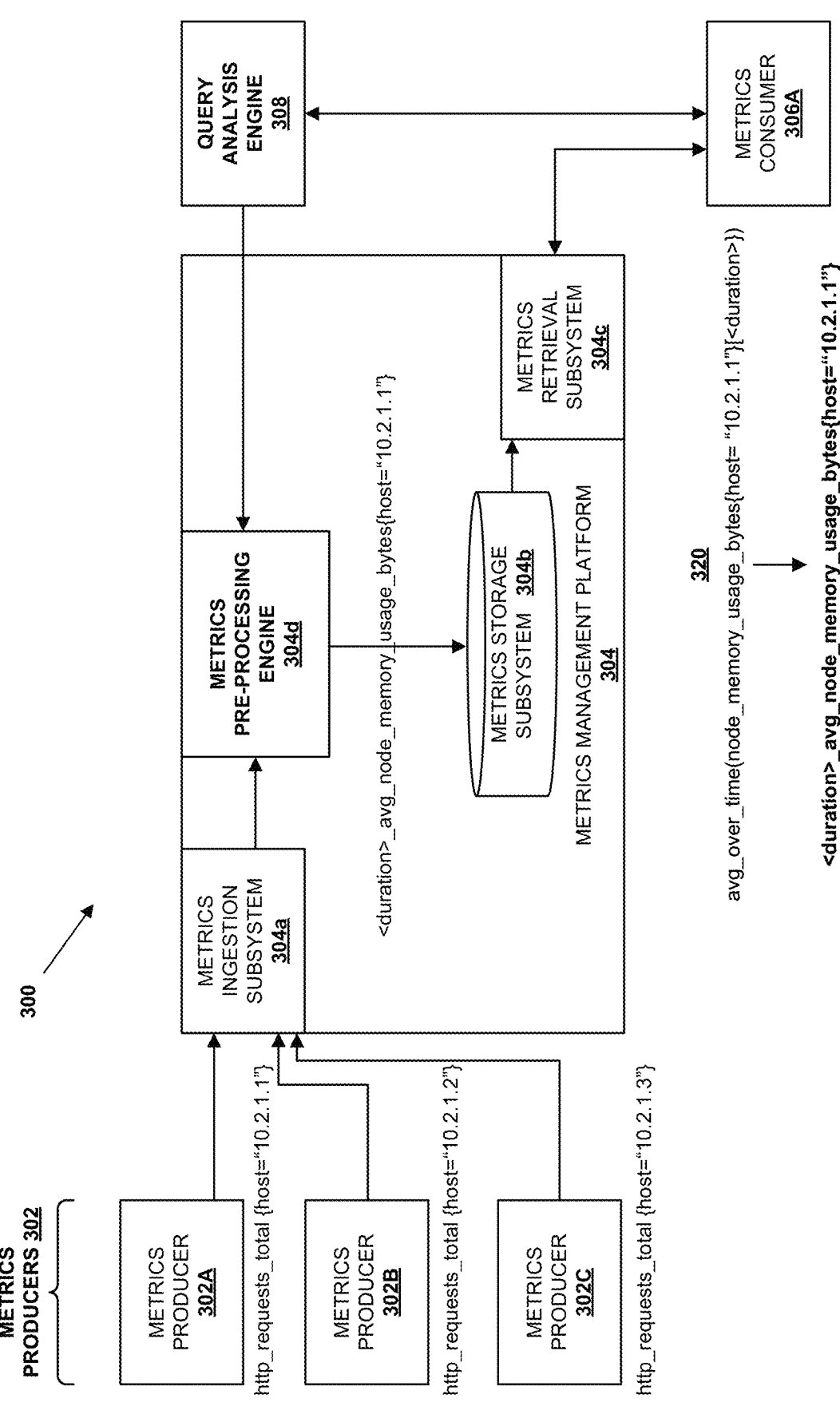
FIG. 3C illustrates another example of the functionality that may be carried out by the query analysis engine in accordance with the first embodiment of the disclosed technology.

In particular, as shown in FIG. 3C, the given metrics producer 302A may be configured to produce metric data for a node_memory_usage_bytes{host="10.2.1.1"} metric that indicates the memory usage of a host having an IP address of "10.2.1.1." Further, as shown in FIG. 3C, the saved query 320 to be run by the given metrics consumer 306A may have an expression of avg_over_time (node_memory_usage_bytes{host="10.2.1.1"}[<duration>]), which specifies that the given metrics consumer 306A is to (i) fetch all stored samples of the node_memory_usage_bytes{host="10.2.1.1"} metric from a lookback window having the specified duration back from the execution time of the saved query 320, and (ii) average the fetched samples together to produce a single, aggregated value representing an average of the memory usage of the 10.2.1.1 host during the lookback window, among other possibilities. Thus, in this example, the saved query's cardinality level is dependent on the duration of the lookback window and the sampling interval of the node_memory_usage_bytes{host="10.2.1.1"} metric—if the ratio between the duration of the lookback window and the sampling interval is smaller (e.g., a duration on the order of minutes and a 1-minute sampling interval), the saved query's cardinality level will be lower, whereas if the ratio between the duration of the lookback window and the sampling interval is larger (e.g., a duration on the order of hours or days and a 1-minute sampling interval), the example saved query's cardinality level will be higher and could impact negatively query performance.

In accordance with the first embodiment of the disclosed technology, the query analysis engine 308 may perform an analysis of the saved query 320 in order to determine whether the saved query 320 is a candidate for cardinality reduction, and if so, the query analysis engine 308 may determine a strategy for reducing the cardinality level of the saved query 320. For instance, in this example, the query analysis engine 308 may determine that the saved query 320 is a candidate for cardinality reduction based on its use of an aggregation operation on a range of multiple samples for a given metric, and may then determine a strategy for reducing the cardinality level of the saved query 320 that involves (i) defining a new composite metric identified as <duration>_avg_node_memory_usage_bytes{host= "10.2.1.1"} that comprises an average of the samples of the node_memory_usage_bytes{host="10.2.1.1"} metric during a lookback window having the specified duration, which is to be used by the saved query 320 in place of the node_memory_usage_bytes{host="10.2.1.1"} metric, (ii) configuring the metrics pre-processing engine 304*d* to begin producing and writing samples for the new <duration>_avg_node_memory_usage_bytes{host= "10.2.1.1"} metric, and (iii) updating the expression of the saved query 320 so that it specifies the new <duration>_avg_node_memory_usage_bytes{host= "10.2.1.1"} metric instead of the node_memory_usage_bytes{host="10.2.1.1"} metric that forms the basis for the new <duration>_avg_node_memory_usage_bytes{host= "10.2.1.1"} metric. In turn, the query analysis engine 308 may cause the determined strategy to be implemented by (i) instructing the metrics pre-processing engine 304*d* to begin producing and writing samples for a new <duration>_avg_node_memory_usage_bytes{host= "10.2.1.1"} metric that comprises an average of the samples of the node_memory_usage_bytes{host="10.2.1.1"} metric during a lookback window having the specified duration and (ii) instructing the given metrics consumer 306A to modify the saved query's expression from avg_over_time (node_memory_usage_bytes{host="10.2.1.1"}[<duration>]) to <duration>_avg_node_memory_usage_bytes{host= "10.2.1.1"}.

In some implementations, the determined strategy for reducing the cardinality level of the saved query 320 may further involve configuring the metrics pre-processing engine 304*d* to either block metric data for the node_memory_usage_bytes{host="10.2.1.1"} metric from being persistently stored in the metrics storage subsystem 304*b* or store metric data for the node_memory_usage_bytes{host="10.2.1.1"} metric in a lower storage tier of the metrics storage subsystem 304*b*, in which case the query analysis engine's functionality for causing the determined strategy to be implemented may further involve instructing the metrics pre-processing engine 304*d* to begin performing such a modified handling action with respect to metric data for the node_memory_usage_bytes{host="10.2.1.1"} metric.

After the query analysis engine 308 carries out this functionality, the metrics pre-processing engine 304*d* may function to compute a time series of samples for the composite <duration>_avg_node_memory_usage_bytes{host= "10.2.1.1"} metric in accordance with a certain sampling interval (e.g., a 1-minute sampling interval), where each respective sample of the <duration>_avg_node_memory_usage_bytes{host= "10.2.1.1"} metric is computed by averaging samples of the node_memory_usage_bytes{host="10.2.1.1"} metric from a lookback window extending back from the sample time and having the specified duration. For example, in a scenario where the specified duration is 1 day, the metrics pre-processing engine 304*d* may compute (i) a first sample $S_1$ of a composite 1d_avg_node_memory_usage_bytes{host="10.2.1.1"} metric having a sample time of $T_1$ by averaging ingested samples of the node_memory_usage_bytes{host="10.2.1.1"} metric that were produced in the 1-day window prior to $T_1$, (ii) a second sample $S_2$ of the composite 1d_avg_node_memory_usage_bytes{host="10.2.1.1"} metric having a sample time of $T_2$ by averaging ingested samples of the node_memory_usage_bytes{host="10.2.1.1"} metric that were produced in the 1-day window prior to $T_2$, and so on for each subsequent sample of the composite 1d_avg_node_memory_usage_bytes{host="10.2.1.1"} metric. As noted above, in some implementations, the metrics pre-processing engine 304*d* may also function to either block the ingested samples of the node_memory_usage_bytes{host="10.2.1.1"} metric from being persistently stored in the metrics storage subsystem 304*b* stored or store such ingested samples in a lower storage tier of the metrics storage subsystem 304*b*, so as to reduce the storage footprint of the metrics data.

Further, during each subsequent run of the modified version of the saved query 320, the given metrics consumer 306A may function to fetch a most-recent sample of the composite <duration>_avg_node_memory_usage_bytes{host= "10.2.1.1"} metric as opposed to fetching a number of individual samples of the node_memory_usage_bytes{host="10.2.1.1"} metric. In this respect, the cardinality level of the saved query 320 is reduced, which in turn reduces the time and compute resources required to carry out each subsequent run of the saved query 320.

The query analysis engine 308 may carry out similar functionality for other saved queries having expressions that apply an aggregation operation to a time window of multiple samples of a given metric, such as an avg, sum, min, max, or count operation applied over a time window of metric samples having a specified duration, among other possibilities.

It should also be understood that, based on the query analysis engine's analysis of a saved query having an expression that applies an aggregation operation to a time window of multiple samples of a given metric, the query analysis engine 308 could determine not to take an action in order to reduce the cardinality level of the saved query. For example, if the ratio between the duration of the lookback window for the aggregation operation and the sampling interval of the given metric is smaller, such as a ratio that would only require a relatively small number of samples to be fetched during each run of the saved query (e.g., duration on the order of minutes and a 1-minute sampling interval), the query analysis engine 308 could determine that the cardinality level of the saved query is already within acceptable limits and thereby determine not to take an action in order to reduce the cardinality level of the saved query despite the fact that some extent of cardinality reduction could be achieved by replacing the aggregation operation with a new composite metric.

Yet another illustrative example of the functionality that may be carried out by the query analysis engine 308 in accordance with the first embodiment of the disclosed technology will now be described with reference to FIG. 3D, which shows a scenario where (i) a plurality of the metrics producers 302 are configured to produce metric data for respective metrics having the same metric name but different respective labels and (ii) a given metrics consumer 306A is configured to run a third representative saved query 330 having an expression that aggregates multiple different metrics over time (e.g., by referencing a metric name without specifying any labels), which causes the given metrics consumer to 306A to fetch multiple samples of every single metric in the set (e.g., every metric having the same metric name) every time the saved query 300 is run.

Figure 3D:
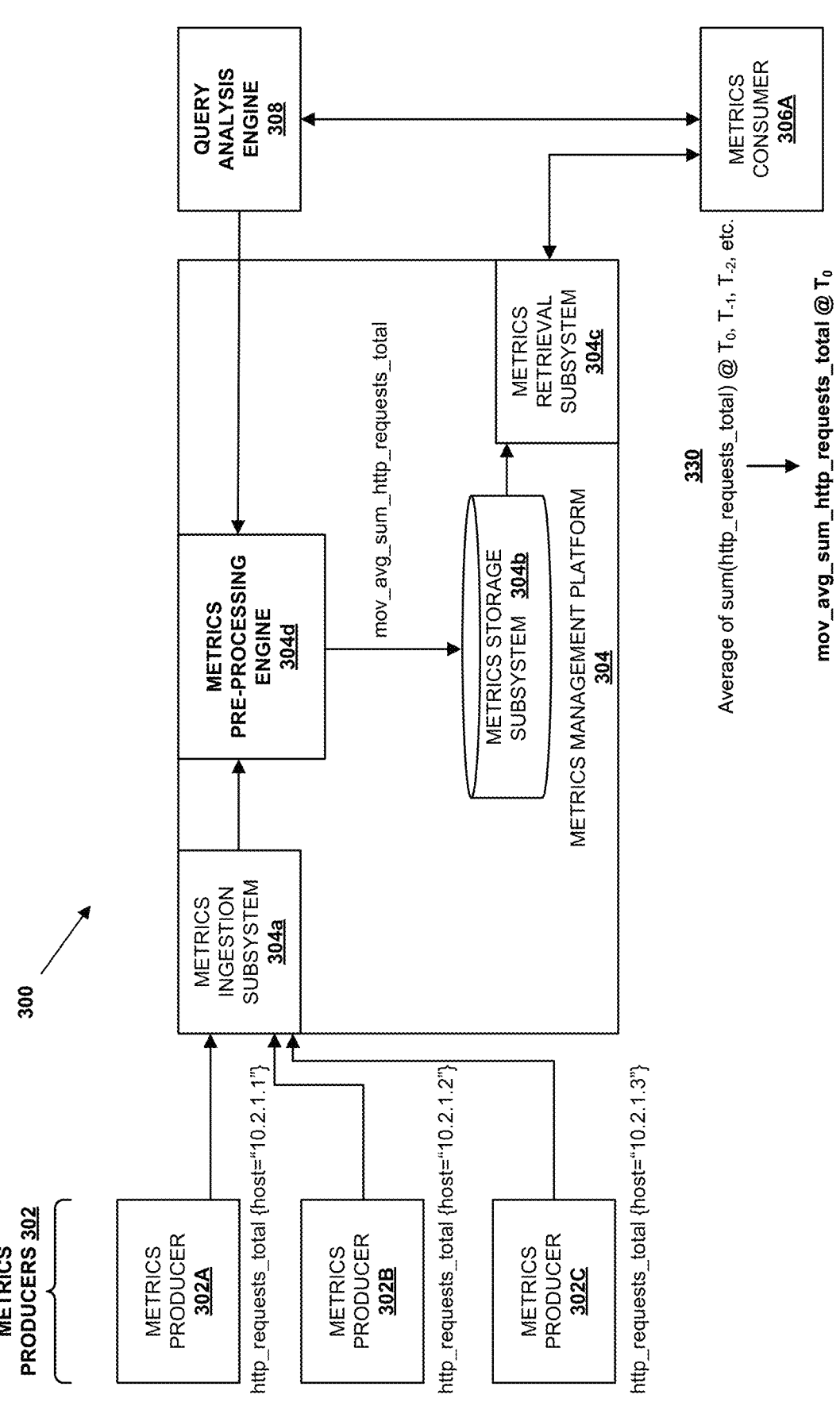
FIG. 3D illustrates yet another example of the functionality that may be carried out by the query analysis engine in accordance with the first embodiment of the disclosed technology.

In particular, as in the example of FIG. 3B, the example of FIG. 3D involves a plurality of the metrics producers 302 that are configured to produce metric data for metrics having a same metric name of http_requests_total but having different values for a host label. However, in the example of FIG. 3D, the saved query 330 to be run by the given metrics consumer 306A may have an expression that applies a sum operation to the individual http_requests_total metrics at multiple different timepoints (e.g., the current time and one or more time points in the past) and then applies an avg operation to the resulting values, which specifies that the given metrics consumer 306A is to (i) fetch stored samples of each http_requests_total metric from the specified timepoints, (ii) at each specified timepoint, sum the fetched samples together to produce a respective aggregated value representing a sum of the total number of HTTP requests handled by the different hosts as of the specified timepoint, and (iii) average the respective aggregated values computed for the specified timepoints to produce a single, aggregated value representing a moving average of the sum total number of HTTP requests handled by the different hosts. Thus, in this example, the saved query's cardinality level is dependent on how many different host-level http_requests_total metrics are being produced by the metrics producers 306 in the network environment 300 as well as the number of timepoints specified by the saved query 330.

In accordance with the first embodiment of the disclosed technology, the query analysis engine 308 may perform an analysis of the saved query 330 in order to determine whether the saved query 330 is a candidate for cardinality reduction, and if so, the query analysis engine 308 may determine a strategy for reducing the cardinality level of the saved query 330. For instance, in this example, the query analysis engine 308 may determine that the saved query 330 is a candidate for cardinality reduction based on its use of an aggregation operation on an unbounded set of individual metrics as well as its use of an aggregation operation on multiple samples over time, and may then determine a strategy for reducing the cardinality level of the saved query 330 that involves (i) defining a new composite metric identified as mov_avg_sum_http_requests_total that comprises a moving average of the sum of individual http_requests_total{host=<value>} metrics at multiple timepoints, which is to be used by the saved query 330 in place of the individual http_requests_total{host=<value>} metrics, (ii) configuring the metrics pre-processing engine 304d to begin producing and writing samples for the new composite mov_avg_sum_http_requests_total metric, and (iii) updating the expression of the saved query 330 so that it specifies the new composite mov_avg_sum_http_requests_total metric instead of the individual http_requests_total{host=<value>} metrics that form the basis for the mov_avg_sum_http_requests_total metric. In turn, the query analysis engine 308 may cause the determined strategy to be implemented by (i) instructing the metrics pre-processing engine 304d to begin producing and writing samples for a new mov_avg_sum_http_requests_total metric that comprises a moving average of the sum of individual http_requests_total{host=<value>} metrics at multiple timepoints and (ii) instructing the given metrics consumer 306A to modify the saved query's expression to replace the portion referencing the individual http_requests_total{host=<value>} metrics with the new composite mov_avg_sum_http_requests_total metric.

In some implementations, the determined strategy for reducing the cardinality level of the saved query 330 may further involve configuring the metrics pre-processing engine 304d to either block metric data for the individual http_requests_total{host=<value>} metrics from being persistently stored in the metrics storage subsystem 304b or store metric data for the individual http_requests_total{host=<value>} metrics in a lower storage tier of the metrics storage subsystem 304b, in which case the query analysis engine's functionality for causing the determined strategy to be implemented may further involve instructing the metric s pre-processing engine 304d to begin performing such a modified handling action with respect to metric data for the individual http_requests_total{host=<value>} metrics.

After the query analysis engine 308 carries out this functionality, the metrics pre-processing engine 304d may function to compute a time series of samples for the composite mov_avg_sum_http_requests_total metric in accordance with a certain sampling interval (e.g., a 1-minute sampling interval), where each respective sample of the mov_avg_sum_http_requests_total metric is computed by (i) computing a sum of the individual http_requests_total{host=<value>} metrics at multiple different timepoints and (ii) averaging the resulting sums together. For example, the metrics pre-processing engine 304d may compute (i) a first sample $S_1$ of the composite mov_avg_sum_http_requests_total metric having a sample time of $T_1$ by summing ingested samples of the individual http_requests_total{host=<value>} metrics at multiple different timepoints that are defined relative to $T_1$ (e.g., $T_1$, $T_1$–1 m, $T_1$–2 m, etc.) and then averaging those summed values, (ii) a second sample $S_2$ of the composite mov_avg_sum_http_requests_total metric having a sample time of $T_2$ by summing ingested samples of the individual http_requests_total{host=<value>} metrics at multiple different timepoints that are defined relative to $T_1$ (e.g., $T_2$, $T_2$–1 m, $T_2$–2 m, etc.) and then averaging those summed values, and so on for each subsequent sample of the composite mov_avg_sum_http_requests_total metric. As noted above, in some implementations, the metrics pre-processing engine 304d may also function to either block the ingested samples of the individual http_requests_total{host=<value>} metrics from being persistently stored in the metrics storage subsystem 304b or store such ingested samples in a lower storage tier of the metrics storage subsystem 304b, so as to reduce the storage footprint of the metrics data.

Further, during each subsequent run of the modified version of the saved query 330, the given metrics consumer 306A may function to fetch a most-recent sample of the composite mov_avg_sum_http_requests_total metric as opposed to fetching multiple different samples of every metric having a metric name of http_requests_total. In this respect, the cardinality level of the saved query 330 is reduced, which in turn reduces the time and compute resources required to carry out each subsequent run of the saved query 330.

The query analysis engine 308 may carry out similar functionality for other saved queries having expressions that aggregate multiple different metrics over time.

It should also be understood that, based on the query analysis engine's analysis of a saved query having an expression that aggregates multiple different metrics over time, the query analysis engine 308 could determine not to take an action in order to reduce the cardinality level of the saved query. For example, if the saved query's expression aggregates a relatively-small, bounded set of metrics over a relatively-small window of time, the query analysis engine 308 could determine that the cardinality level of the saved query is already within acceptable limits and thereby determine not to take an action in order to reduce the cardinality level of the saved query despite the fact that some extent of cardinality reduction could be achieved by replacing the aggregation operations with a new composite metric.

The functionality that may be carried out by the query analysis engine 308 in accordance with the first embodiment of the disclosed technology may take various other forms as well.

Figure 4A:
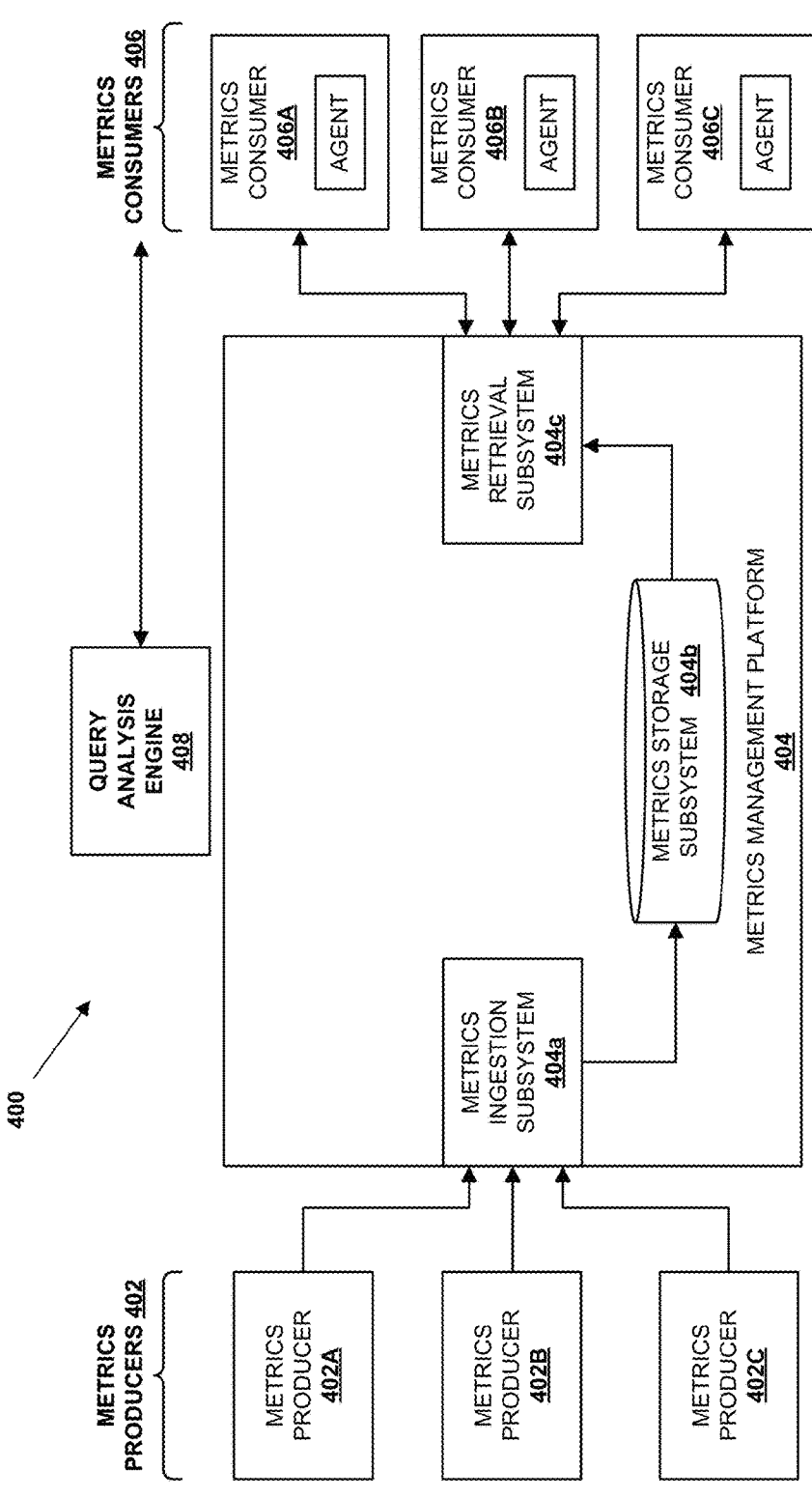
FIG. 4A illustrates a network environment in which a second embodiment of the disclosed technology has been implemented.

FIG. 4A illustrates a network environment 400 in which the second embodiment of the disclosed technology has been implemented. As with the network environment 100 of FIG. 1, the network environment 400 includes (i) a plurality of metrics producers 402, of which metrics producers 402A, 402B, and 402C are shown as examples, (ii) a metrics management platform 404 comprising a metrics ingestion subsystem 404a, a metrics storage subsystem 404b, and a metrics retrieval subsystem 404c, and (iii) a plurality of metrics consumers 406, of which metrics consumers 406A, 406B, and 406C are shown as examples. However, unlike the network environment 100 of FIG. 1, the network environment 400 of FIG. 4 further includes (i) a query processing agent installed on each metrics consumer 406 that is configured to run queries and (ii) a query analysis engine 408 that is configured to interact with metrics consumers 406 that are configured to run queries and the query processing agents installed thereon. (While the query analysis engine 408 is shown in FIG. 4 as a separate system from the metrics management platform 404, it should be understood that the query analysis engine 408 could also be implemented as a functional subsystem of the metrics management platform 404).

In accordance with the present disclosure, the query analysis engine 408 may be configured to analyze saved queries that are to be run by one or more of the metrics consumers 406 in order to determine whether any of the saved queries are candidates for cardinality reduction. And for each saved query that is determined to be a candidate for cardinality reduction, the query analysis engine 408 may determine a strategy for reducing the saved query's cardinality level based on its analysis of the saved query and then cause the determined strategy to be implemented by (i) defining at least one new composite metric that is to be used by the saved query as a means for reducing the extent of samples (e.g., the number of discrete timeseries) that are to be fetched during each run of the saved query, (ii) instructing a query processing agent of the metric consumer 406 configured to run the saved query to begin extracting samples of the at least one new composite metric during runs of the saved query and sending such samples back to the metric management platform 404 for storage, and (iii) instructing the metric consumer 406 to modify the saved query's expression so that it encodes a request for metric data for the at least one new composite metric in place of some portion of the original expression. In turn, the query processing agent of the metric consumer 406 may thereafter function to extract samples of the at least one new composite metric during runs of the saved query and send such samples back to the metric management platform 404 for storage, and the metric consumer 406 may thereafter function to run the modified version of the saved query.

One illustrative example of the functionality that may be carried out by the query analysis engine 408 in accordance with the second embodiment of the disclosed technology will now be described with reference to FIG. 4B, which shows a scenario where (i) a given metrics producer 402A is configured to produce metric data for a given metric and (ii) a given metrics consumer 406A is configured to run a first representative saved query 410 having an expression that applies an aggregation operation to a time window of multiple samples of the given metric.

Figure 4B:
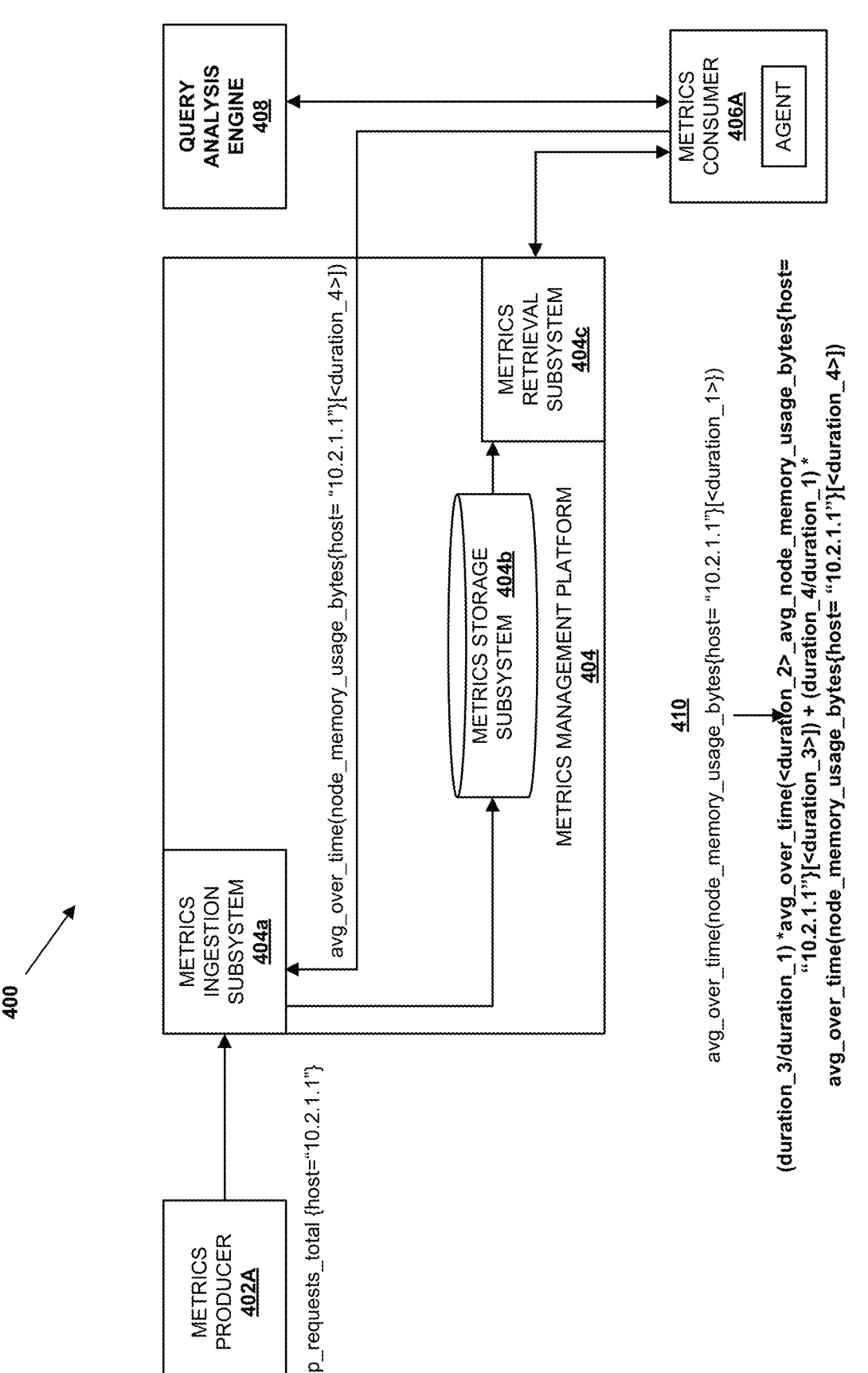
FIG. 4B illustrates one example of the functionality that may be carried out by the query analysis engine in accordance with the second embodiment of the disclosed technology.

In particular, as shown in FIG. 4B, the given metrics producer 402A may be configured to produce metric data for a node_memory_usage_bytes{host="10.2.1.1"} metric that indicates the memory usage of a host having an IP address of "10.2.1.1." Further, as shown in FIG. 4B, the saved query 410 to be run by the given metrics consumer 406A may have an expression of avg_over_time (node_memory_usage_bytes{host="10.2.1.1"}[<duration_1>]), which specifies that the given metrics consumer 406A is to (i) fetch all stored samples of the node_memory_usage_bytes{host="10.2.1.1"} metric from a lookback window having the specified duration_1 back from the execution time of the saved query, (ii) average the fetched samples together to produce a single, aggregated value representing an average of the memory usage of the 10.2.1.1 host during the lookback window. For example, in a scenario where the node_memory_usage_bytes{host="10.2.1.1"} metric has a sampling interval of 1 minute and the specified duration_1 of the saved query 410 is 1 day, then during each run of the saved query 410, the given metrics consumer 406A fetches samples of the node_memory_usage_bytes{host="10.2.1.1"} metric from a lookback window that extends 1 day back from the execution time of the saved query 410 (e.g., 1440 samples) and computes an average of the fetched samples over the past 1 day.

Thus, in this example, the saved query's cardinality level is dependent on the duration of the lookback window and the sampling interval of the node_memory_usage_bytes{host="10.2.1.1"} metric—if the ratio between the duration of the lookback window and the sampling interval is smaller (e.g., a duration on the order of minutes and a 1-minute sampling interval), the saved query's cardinality level will be lower, whereas if the ratio between the duration of the lookback window and the sampling interval is larger (e.g., a duration on the order of hours or days and a 1-minute sampling interval), the example saved query's cardinality level will be higher and could impact negatively query performance.

In accordance with the second embodiment of the disclosed technology, the query analysis engine 408 may perform an analysis of the saved query 410 in order to determine whether the saved query 410 is a candidate for cardinality reduction, and if so, the query analysis engine 408 may determine a strategy for reducing the cardinality level of the saved query 410. For instance, in this example, the query analysis engine 408 may determine that the saved query 410 is a candidate for cardinality reduction based on its use of an aggregation operation on a range of multiple samples for a given metric, and may then determine a strategy for reducing the cardinality level of the saved query 410 that involves (i) defining a new composite metric identified as <duration_2>_avg_node_memory_usage_bytes{host= "10.2.1.1"} that comprises an average of the samples of the node_memory_usage_bytes{host="10.2.1.1"} metric during a time window having a duration_2 that corresponds to the refresh interval of the saved query, (ii) configuring the query processing agent of the given metrics consumer 406A to begin extracting samples of the new <duration_2>_avg_node_memory_usage_bytes{host= "10.2.1.1"} metric during runs of the saved query 410 and sending such samples back to the metric management platform 404 for storage, and (iii) updating the expression of the saved query 410 so that it uses samples of the composite <duration_2>_avg_node_memory_usage_bytes{host= "10.2.1.1"} metric in place of certain samples of the node_memory_usage_bytes{host="10.2.1.1"} metric. In turn, the query analysis engine 408 may cause the determined strategy to be implemented by (i) instructing the query processing agent to begin extracting and transmitting samples for a new <duration_2>_avg_node_memory_usage_bytes{host= "10.2.1.1"} metric that each comprises an average of the samples of the node_memory_usage_bytes{host="10.2.1.1"} metric during a time window having a duration_2 that corresponds to the refresh interval of the saved query 410 and (ii) instructing the given metrics consumer 406A to modify the saved query's expression from avg_over_time (node_memory_usage_bytes{host="10.2.1.1"}[<duration_1>]) to an expression that computes the average of the node_memory_usage_bytes{host="10.2.1.1"} metric during the lookback window having the specified duration_1 by using samples of the <duration_2>_avg_node_memory_usage_bytes{host= "10.2.1.1") metric from the portion of the saved query's lookback window for which such samples are available, which is defined as duration_3, and then using samples of the node_memory_usage_bytes{host="10.2.1.1"} metric from the remaining portion of the lookback window for which such samples are not available, which is defined as duration_4 (were duration_3+duration_4=duration_1).

After the query analysis agent carries out this functionality, the given metrics consumer 406A may perform one additional run of the original version of the saved query 410, and during that run, the query processing agent may extract and transmit new samples of the composite <duration_2>_avg_node_memory_usage_bytes{host= "10.2.1.1"} metric that each comprises an average of the samples of the node_memory_usage_bytes{host="10.2.1.1"} metric from a respective time window having a duration_2 that corresponds to a refresh interval of the saved query 410. For example, in a scenario where the node_memory_usage_bytes{host="10.2.1.1" } metric has a sampling interval of 1 minute, the saved query 410 has a refresh interval of 30 minutes, and the specified duration_1 of the saved query's lookback window is 1 day, the query analysis agent may function such that, during the one additional run of the saved query 410 when the given metrics consumer 406A fetches samples of the node_memory_usage_bytes{host="10.2.1.1" } metric from the past 1 day (e.g., 1440 samples) and computes an average of the fetched samples over the past 1 day, the query processing agent may extract and transmit 48 new samples of a composite 30 m_avg_node_memory_usage_bytes{host="10.2.1.1"} metric that each comprises an average of the fetched samples of the node_memory_usage_bytes{host="10.2.1.1"} metric from a respective 30-minute time window during the saved query's 1-day lookback window. In this way, the query processing agent may begin to produce a time series of samples of the 30 m_avg_node_memory_usage_bytes{host="10.2.1.1"} metric having a sampling interval of 30 minutes, which matches the refresh interval of the saved query 410.

After this one additional run of the original version of the saved query 410, the given metrics consumer 406A may begin to run the modified version of the saved query 410, and during each such run of the saved query 410, the given metrics consumer 406A may function to (i) fetch samples of the composite <duration_2>_avg_node_memory_usage_bytes{host= "10.2.1.1" } metric from the portion of the lookback window for which such samples are available, (ii) fetch samples of the node_memory_usage_bytes{host="10.2.1.1"} metric from the remaining portion of the lookback window, and (iii) using the fetched samples of these two metrics to compute an average of the node_memory_usage_bytes{host="10.2.1.1"} metric across the lookback window. For example, in a scenario where the node_memory_usage_bytes{host="10.2.1.1"} metric has a sampling interval of 1 minute, the saved query 410 has a refresh interval of 30 minutes, and the specified duration_1 of the saved query's lookback window is 1 day, there will typically be samples of the composite 30 m_avg_node_memory_usage_bytes{host="10.2.1.1"} metric available for the first 23.5 hours of the saved query's 1-day lookback window, and the given metrics consumer 406A may function to (i) fetch samples of the composite 30 m_avg_node_memory_usage_bytes{host="10.2.1.1"} metric for the first 23.5 hours of the saved query's 1-day lookback window (e.g., 47 samples), (ii) fetch samples of the node_memory_usage_bytes{host="10.2.1.1"} metric for the last 30 minutes of the saved query's 1-day lookback window (e.g., 30 samples), and (iii) use the fetched samples of these two metrics to compute an average of the node_memory_usage_bytes{host="10.2.1.1"} metric across the saved query's 1-day lookback window, which may involve averaging the samples of the node_memory_usage_bytes{host="10.2.1.1"} metric from the last 30 minutes of the saved query's 1-day lookback window into a time-aggregated value and then computing an average of the 47 samples of the 30 m_avg_node_memory_usage_bytes{host="10.2.1.1"} metric along with the time-aggregated value of the node_memory_usage_bytes{host="10.2.1.1"} metric. Correspondingly, the query processing agent may extract the computed time-aggregated value of the node_memory_usage_bytes{host="10.2.1.1"} metric as a new sample of the 30 m_avg_node_memory_usage_bytes{host="10.2.1.1"} metric for a new time window extending 30 minutes back from the execution time of the saved query 410 and transmit that new sample back to the metrics management platform 404 for storage, so that the new sample is available during the next run of the saved query 410. Thus, in this example, the number of samples fetched by the given metrics consumer 406A during each run by the saved query 410 may be reduced from 1440 samples to 77 samples, which may in turn reduce the cardinality of the saved query 410 by nearly 95%.

The query analysis engine 408 may carry out similar functionality for other saved queries having expressions that apply an aggregation operation to a time window of multiple samples of a given metric, such as an avg, sum, min, max, or count operation applied over a time window of metric samples having a specified duration, among other possibilities.

It should also be understood that, based on the query analysis engine's analysis of a saved query having an expression that applies an aggregation operation to a time window of multiple samples of a given metric, the query analysis engine 308 could determine not to take an action in order to reduce the cardinality level of the saved query. For example, if the ratio between the duration of the lookback window for the aggregation operation and the sampling interval of the given metric is smaller, such as a ratio that would only require a relatively small number of samples to be fetched during each run of the saved query (e.g., duration on the order of minutes and a 1-minute sampling interval), the query analysis engine 408 could determine that the cardinality level of the saved query is already within acceptable limits and thereby determine not to take an action in order to reduce the cardinality level of the saved query despite the fact that some extent of cardinality reduction could be achieved by replacing the aggregation operation with a new composite metric.

Another illustrative example of the functionality that may be carried out by the query analysis engine 408 in accordance with the second embodiment of the disclosed technology will now be described with reference to FIG. 4C, which shows a scenario where (i) a plurality of the metrics producers 402 are configured to produce metric data for respective metrics having the same metric name but different respective labels and (ii) a given metrics consumer 406A is configured to run a second representative saved query 420 having an expression that aggregates multiple different metrics over time (e.g., by referencing a metric name without specifying any labels), which causes the given metrics consumer to 406A to fetch multiple samples of every single metric in the set (e.g., every metric having the same metric name) every time the example saved query is run.

Figure 4C:
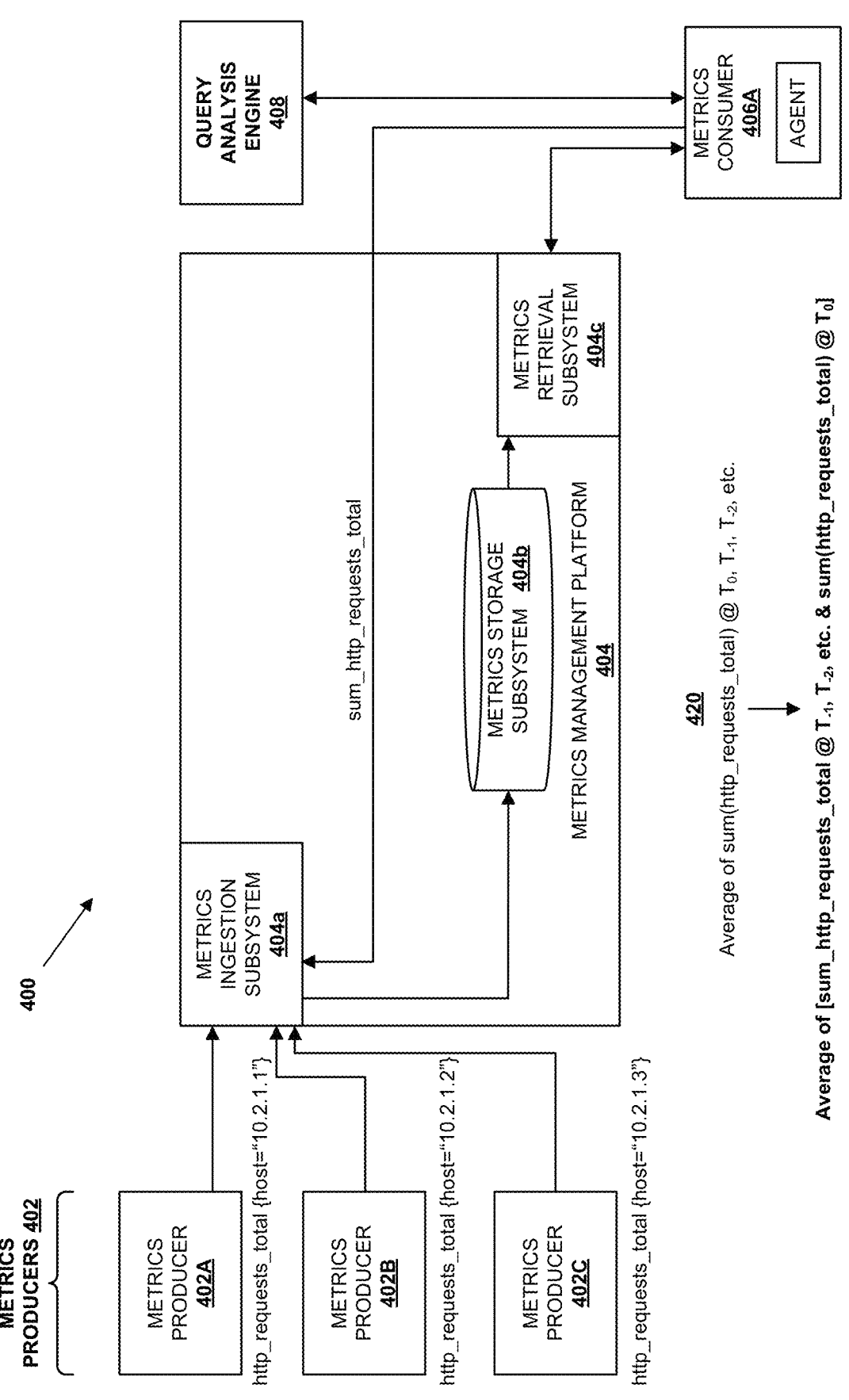
FIG. 4C illustrates another example of the functionality that may be carried out by the query analysis engine in accordance with the second embodiment of the disclosed technology.

In particular, as in the examples of FIGS. 3B and 3D, the example of FIG. 4C involves a plurality of the metrics producers 402 that are configured to produce metric data for metrics having a same metric name of http_requests_total but having different values for a host label. Further, as in the example of FIG. 3D, the saved query 420 to be run by the given metrics consumer 406A in this example may have an expression that applies a sum operation to the individual http_requests_total metrics at multiple different timepoints within some lookback window (e.g., the current time and one or more time points in the past) and then applies an avg operation to the resulting values, which specifies that the given metrics consumer 406A is to (i) fetch stored samples of each individual http_requests_total metric from the specified timepoints, (ii) at each specified timepoint, sum the fetched samples together to produce a respective aggregated value representing a sum of the total number of HTTP requests handled by the different hosts as of the specified timepoint, and (iii) average the respective aggregated values computed for the specified timepoints to produce a single, aggregated value representing a moving average of the sum total number of HTTP requests handled by the different hosts. For example, in a scenario where the individual http_requests_total{host=<value>} metrics have a sampling interval of 1 minute, the saved query 420 has a refresh interval of 30 minutes, and the saved query 420 evaluates timepoints across a 5-minute lookback window, then during each run of the saved query 420, the given metrics consumer 406A (i) fetches samples of each individual http_requests_total metric from the current timepoint as well as the preceding 5 timepoints, (ii) at each specified timepoint, sums the fetched samples together to produce a respective aggregated value representing a sum of the total number of HTTP requests handled by the different hosts as of the specified timepoint, which produces a set of 6 aggregated values at the 6 timepoints falling within the saved query's 5-minute lookback window, and (iii) average the 6 aggregated values to produce a single, aggregated value representing a moving average of the sum total number of HTTP requests handled by the different hosts over the 5-minute lookback window. Thus, in this example, the saved query's cardinality level is dependent on how many different host-level http_requests_total metrics are being produced by the metrics producers 406 in the network environment 400 as well as the number of timepoints specified by the saved query 420.

In accordance with the second embodiment of the disclosed technology, the query analysis engine 408 may perform an analysis of the saved query 420 in order to determine whether the saved query 420 is a candidate for cardinality reduction, and if so, the query analysis engine 408 may determine a strategy for reducing the cardinality level of the saved query 420. For instance, in this example, the query analysis engine 408 may determine that the saved query 420 is a candidate for cardinality reduction based on its use of an aggregation operation on an unbounded set of individual metrics as well as its use of an aggregation operation on multiple samples over time, and may then determine a strategy for reducing the cardinality level of the saved query 420 that involves (i) defining a new composite metric identified as sum_http_requests_total that comprises the sum of individual http_requests_total{host=<value>} metrics at a respective timepoint, (ii) configuring the query processing agent of the given metrics consumer 406A to begin extracting samples of the new sum_http_requests_total metric during runs of the saved query 420 and sending such samples back to the metric management platform 404 for storage, and (iii) updating the expression of the saved query 420 so that it uses samples of the composite sum_http_requests_total metric in place of certain samples of the http_requests_total{host=<value>} metrics. In turn, the query analysis engine 408 may cause the determined strategy to be implemented by (i) instructing the query processing agent to begin extracting and transmitting samples for a new sum_http_requests_total metric that each comprises a sum of the individual http_requests_total{host=<value>} metrics at a respective timepoint and (ii) instructing the given metrics consumer 406A to modify the saved query's expression so that it uses samples of the new sum_http_requests_total metric for a portion of the timepoints and uses samples of the individual http_requests_total{host=<value>} metrics for at least one remaining timepoint.

After the query analysis agent carries out this functionality, the given metrics consumer 406A may perform one additional run of the original version of the saved query 420, and during that run, the query processing agent may extract and transmit new samples of the composite sum_http_requests_total metric that each comprises a sum of the individual http_requests_total{host=<value>} metrics at a respective timepoint within the saved query's lookback window. For example, in a scenario where the individual http_requests_total{host=<value>} metrics have a sampling interval of 1 minute, the saved query 420 has a refresh interval of 30 minutes, and the saved query 420 evaluates timepoints across a 5-minute lookback window, the query analysis agent may function such that, during the one additional run of the saved query 420 when the given metrics consumer 406A fetches samples of the individual http_requests_total{host=<value>} metrics from 6 time-points within the 5-minute lookup window, sums the fetched samples across the hosts at each timepoint, and averages the timepoint-specific summed values together across the time-points, the query processing agent may extract and transmit 6 new samples of a composite sum_http_requests_total metric that each comprises a sum of the fetched samples of the individual http_requests_total{host=<value>} metrics at a respective timepoint during the saved query's 5-minute lookback window. In this way, the query processing agent may begin to produce a time series of samples of the sum_http_requests_total metric.

After this one additional run of the original version of the saved query 420, the given metrics consumer 406A may begin to run the modified version of the saved query 420, and during each such run of the saved query 420, the given metrics consumer 406A may function to (i) fetch samples of the composite sum_http_requests_total metric from the por-tion of the lookback window for which such samples are available, (ii) fetch samples of the individual http_requests_total{host=<value>} metrics from the remaining portion of the lookback window, and (iii) using the fetched samples of these two metrics to compute a moving average of the individual http_requests_total{host=<value>} metrics across the look-back window. For example, in a scenario where the indi-vidual http_requests_total{host=<value>} metrics have a sampling interval of 1 minute, the saved query 420 has a refresh interval of 30 minutes, and the saved query 420 evaluates timepoints across a 5-minute lookback window, there will typically be samples of the composite sum_htt-p_requests_total metric available for the first 5 timepoints within the saved query's 5-day lookback window, and the given metrics consumer 406A may function to (i) fetch samples of the composite sum_http_requests_total metric for the first 5 timepoints of the saved query's 5-minute lookback window (e.g., 5 samples), (ii) fetch samples of the individual http_requests_total{host=<value>} metrics for the last timepoint of the saved query's 5-minute lookback window (e.g., the most-recent sample of each individual http_requests_total{host=<value>} metric), and (iii) use the fetched samples of these two metrics to compute a moving average of the http_requests_total{host=<value>} metrics across the saved query's 5-day lookback window, which may involve summing the samples of the individual http_requests_total{host=<value>} metrics for the last time-point into a host-aggregated value and then computing an average of the 5 samples of the sum_http_requests_total metric along with the host-aggregated value of the node_memory_usage_bytes{host="10.2.1.1"} metric for the last timepoint. Correspondingly, the query processing agent may extract the computed host-aggregated value of the individual http_requests_total{host=<value>} metrics for the last timepoint as a new sample of the sum_http_request-s_total metric at that timepoint and transmit that new sample back to the metrics management platform 404 for storage, so that the new sample is available during the next run of the saved query 420. Thus, instead of having to fetch samples of the individual http_requests_total{host=<value>} metrics for multiple different timepoints during each run of the saved query 420, the given metrics consumer 406A may only need to fetch samples of the individual http_requests_total{host=<value>} metrics for a single timepoint, which may in turn reduce the cardinality of the saved query 420—particularly in a scenario where there is a large number of hosts in the network environment 400.

The query analysis engine 408 may carry out similar functionality for other saved queries having expressions that aggregate multiple different metrics over time.

It should also be understood that, based on the query analysis engine's analysis of a saved query having an expression that aggregates multiple different metrics over time, the query analysis engine 408 could determine not to take an action in order to reduce the cardinality level of the saved query. For example, if the saved query's expression aggregates a relatively-small, bounded set of metrics over a relatively-small window of time, the query analysis engine 408 could determine that the cardinality level of the saved query is already within acceptable limits and thereby deter-mine not to take an action in order to reduce the cardinality level of the saved query despite the fact that some extent of cardinality reduction could be achieved by replacing the aggregation operations with a new composite metric.

The functionality that may be carried out by the query analysis engine 408 in accordance with the second embodi-ment of the disclosed technology may take various other forms as well.

Figure 5:
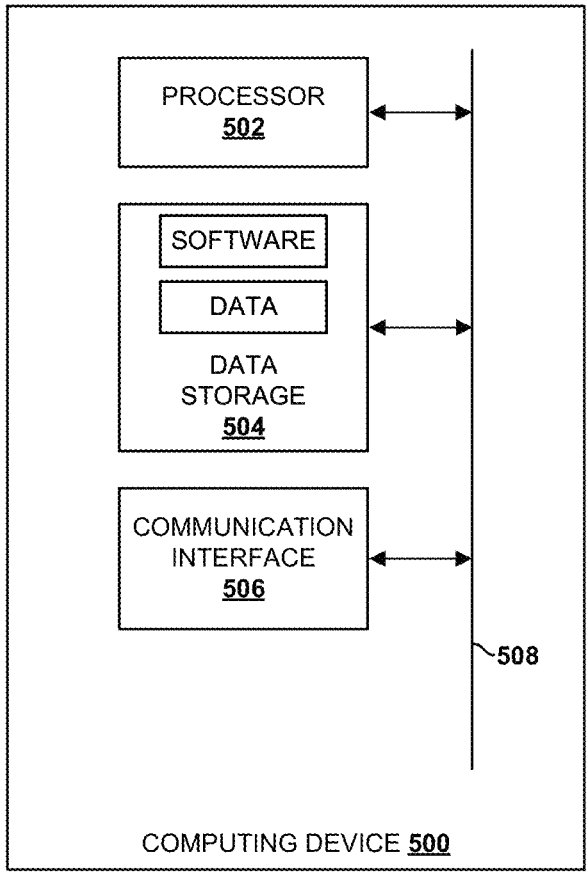
FIG. 5 is a simplified block diagram that illustrates some structural components that may be included in an example computing device.

Turning now to FIG. 5, a simplified block diagram is provided to illustrate some structural components that may be included in an example computing device 500 that may be configured to carry out any of the various functions disclosed herein, including but not limited to the functions of a metrics producer, a metrics consumer, or a query analysis engine. At a high level, the example computing device 500 may include one or more processors 502, data storage 504, and one or more communication interfaces 506, all of which may be communicatively linked by a commu-nication link 508 that may that various forms, one example of which is a system bus.

The one or more processors 502 of the example comput-ing device 500 may comprise one or more processor com-ponents, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, the data storage 504 of the example computing device 500 may comprise one or more non-transitory com-puter-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 502 of the example computing device 500 such that the computing device 500 is configured to perform any of the functions disclosed herein (e.g., functions of a metrics producer, metrics consumer, query analysis engine, etc.), and (ii) data related to the disclosed functionality.

The one or more communication interfaces 506 of the example computing device 500 may take the form of any one or more interfaces that facilitate wireless and/or wired communication with other computing devices or systems, such as a metrics management platform. Each such communication interface 506 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the example computing device 500 may also additionally include an I/O interface, which may generally take the form of (i) one or more input interfaces that are configured to receive and/or capture information at the example computing device 500 and (ii) one or more output interfaces that are configured to output information from the example computing device 500 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of I/O interface may include or provide connectivity to output components such as a display screen and/or an audio speaker, among other possibilities.

It should be understood that the example computing device 500 is one example of a computing device that may be used with the example embodiments described herein. Numerous other arrangements are possible and contemplated herein. For instance, in other embodiments, the example computing device 500 may include additional components not pictured and/or more or fewer of the pictured components.

Figure 6:
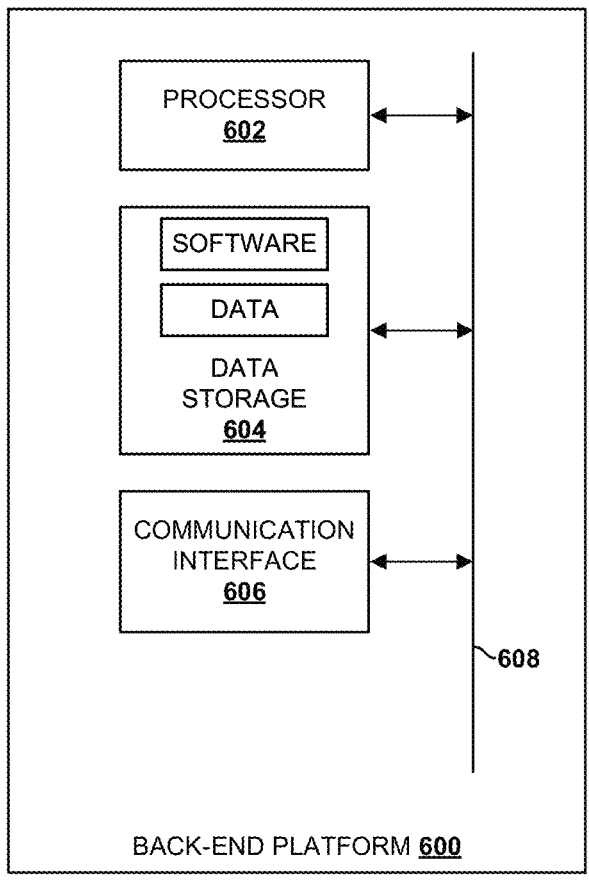
FIG. 6 is a simplified block diagram that illustrates some structural components that may be included in an example back-end platform.

Turning now to FIG. 6, a simplified block diagram is provided to illustrate some structural components that may be included in an example back-end platform 600, which may be configured to carry out any of the various functions disclosed herein, including but not limited to the functions of a metrics management platform (e.g., metrics management platform 304 or metrics management platform 404) and/or the query analysis engine. At a high level, the back-end platform 600 may generally comprise any one or more computing systems that collectively include one or more processors 602, data storage 604, and one or more communication interfaces 606, all of which may be communicatively linked by a communication link 608 that may take the form of a system bus, a communication network such as a public, private, or hybrid cloud, or some other connection mechanism. Each of these components may take various forms.

The one or more processors 602 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that the one or more processors 602 could comprise processing components that are distributed across a plurality of physical computing systems connected via a network, such as a computing cluster of a public, private, or hybrid cloud.

In turn, the data storage 604 may comprise one or more non-transitory computer-readable storage mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 602 such that the back-end platform 600 is configured to perform any of the various back-end platform functions disclosed herein, and (ii) data related to the disclosed back-end platform functionality. In line with the discussion above, it should also be understood that the data storage 604 may comprise computer-readable storage mediums that are distributed across a plurality of physical computing systems connected via a network, such as a storage cluster of a public, private, or hybrid cloud that operates according to technologies such as AWS for Elastic Compute Cloud, Simple Storage Service, etc.

The one or more communication interfaces 606 may take the form of any one or more interfaces that facilitate wireless and/or wired communication with other computing devices or systems, including but not limited to metrics producers, metrics consumers, and the query analysis engine (to the extent it is not included as a functional subsystem of the back-end platform 600), as well as wireless and/or wired communication between functional subsystems of the back-end platform 600. Each such communication interface 606 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the back-end platform 600 may additionally include an I/O interface that facilitates user interaction with the back-end platform 600.

It should be understood that back-end platform 600 is one example of a back-end platform that may be used with the embodiments described herein. Numerous other arrangements are possible and contemplated herein. For instance, other back-end platforms 600 may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A computing platform, comprising:

at least one processor;

at least one non-transitory computer-readable medium; and program instructions stored on the at least one non-transitory computer-readable medium that, when executed by the at least one processor, cause the computing platform to:

perform an analysis of a saved query comprising an expression that specifies a set of one or more metrics for which metric data is to be fetched from a metrics management platform when the saved query is run;

based at least in part on the analysis of the saved query, determine a strategy for reducing a cardinality level of the saved query that involves modifying the expression of the saved query by modifying the specified set of one or more metrics for which metric data is to be fetched when the saved query is run so as to reduce an extent of samples that are to be fetched during each run of the saved query; and cause the saved query to be modified in accordance with the determined strategy for reducing the cardinality level of the saved query.

2. The computing platform of claim 1, wherein the analysis of the saved query comprises an analysis of whether the saved query is a candidate for cardinality reduction.

3. The computing platform of claim 2, wherein the analysis of whether the saved query is a candidate for cardinality reduction comprises an analysis of whether the saved query can be modified to reduce the extent of samples that are to be fetched during at least some runs of the saved query.

4. The computing platform of claim 2, wherein the program instructions that, when executed by the at least one processor, cause the computing platform to determine the strategy for reducing the cardinality level of the saved query based at least in part on the analysis of the saved query comprise program instructions that, when executed by the at least one processor, cause the computing platform to:

determine the strategy for reducing the cardinality level of the saved query in response to a determination that the saved query is a candidate for cardinality reduction.

5. The computing platform of claim 1, wherein the program instructions that, when executed by the at least one processor, cause the computing platform to perform the analysis of the saved query comprise program instructions that, when executed by the at least one processor, cause the computing platform to perform one or more of (i) evaluating how many metrics are specified by the saved query, (ii) evaluating how many samples are to be fetched during each run of the saved query, or (iii) evaluating which types of operations are applied by the saved query.

6. The computing platform of claim 1, wherein the determined strategy for reducing the cardinality level of the saved query that involves modifying the expression of the saved query by modifying the specified set of one or more metrics for which metric data is to be fetched when the saved query is run comprises:

a strategy for reducing the cardinality level of the saved query that involves modifying the expression of the saved query by replacing a request to fetch metric data for a given subset of metrics in the set of one or more metrics with a request to fetch metric data for a composite metric that is derived from the given subset of metrics.

7. The computing platform of claim 6, wherein the determined strategy for reducing the cardinality level of the saved query further involves:

configuring the metrics management platform to begin producing and storing metric data for the composite metric.

8. The computing platform of claim 7, wherein the determined strategy for reducing the cardinality level of the saved query further involves:

configuring the metrics management platform to either (i) block storage of metric data for the given subset of the metrics or (ii) store metric data for the given subset of the metrics in a lower storage tier.

9. The computing platform of claim 6, wherein a given metrics consumer is configured to run the saved query, and wherein the program instructions that, when executed by the at least one processor, cause the computing platform to cause the saved query to be modified in accordance with the determined strategy for reducing the cardinality level of the saved query comprise program instructions that, when executed by the at least one processor, cause the computing platform to:

instruct the given metrics consumer to modify the saved query so that the expression of the saved query encodes the request to fetch metric data for the composite metric.

10. The computing platform of claim 9, wherein the determined strategy for reducing the cardinality level of the saved query further involves:

configuring the given metrics consumer to begin (i) extracting metric data for the composite metric that is produced during runs of the saved query, and (ii) transmitting the extracted metric data for the composite metric to the metrics management platform for storage.

11. A non-transitory computer-readable medium, wherein the non-transitory computer-readable medium is provisioned with program instructions that, when executed by at least one processor, cause a computing platform to:

perform an analysis of a saved query comprising an expression that specifies a set of one or more metrics for which metric data is to be fetched from a metrics management platform when the saved query is run;

based at least in part on the analysis of the saved query, determine a strategy for reducing a cardinality level of the saved query that involves modifying the expression of the saved query by modifying the specified set of one or more metrics for which metric data is to be fetched when the saved query is run so as to reduce an extent of samples that are to be fetched during each run of the saved query; and cause the saved query to be modified in accordance with the determined strategy for reducing the cardinality level of the saved query.

12. The non-transitory computer-readable medium of claim 11, wherein the analysis of the saved query comprises an analysis of whether the saved query is a candidate for cardinality reduction.

13. The non-transitory computer-readable medium of claim 12, wherein the analysis of whether the saved query is a candidate for cardinality reduction comprises an analysis of whether the saved query can be modified to reduce the extent of samples that are to be fetched during at least some runs of the saved query.

14. The non-transitory computer-readable medium of claim 12, wherein the program instructions that, when executed by at least one processor, cause the computing platform to determine the strategy for reducing the cardinality level of the saved query based at least in part on the analysis of the saved query comprise program instructions that, when executed by at least one processor, cause the computing platform to:

determine the strategy for reducing the cardinality level of the saved query in response to a determination that the saved query is a candidate for cardinality reduction.

15. The non-transitory computer-readable medium of claim 11, wherein the program instructions that, when executed by at least one processor, cause the computing platform to perform the analysis of the saved query comprise program instructions that, when executed by at least one processor, cause the computing platform to perform one or more of (i) evaluating how many metrics are specified by the saved query, (ii) evaluating how many samples are to be fetched during each run of the saved query, or (iii) evaluating which types of operations are applied by the saved query.

16. The non-transitory computer-readable medium of claim 11, wherein the determined strategy for reducing the cardinality level of the saved query that involves modifying the expression of the saved query by modifying the specified set of one or more metrics for which metric data is to be fetched when the saved query is run comprises:

a strategy for reducing the cardinality level of the saved query that involves modifying the expression of the saved query by replacing a request to fetch metric data for a given subset of metrics in the set of one or more metrics with a request to fetch metric data for a composite metric that is derived from the given subset of metrics.

17. The non-transitory computer-readable medium of claim 16, wherein the determined strategy for reducing the cardinality level of the saved query further involves:

configuring the metrics management platform to begin producing and storing metric data for the composite metric.

18. The non-transitory computer-readable medium of claim 17, wherein the determined strategy for reducing the cardinality level of the saved query further involves:

configuring the metrics management platform to either (i) block storage of metric data for the given subset of the metrics or (ii) store metric data for the given subset of the metrics in a lower storage tier.

19. The non-transitory computer-readable medium of claim 16, wherein a given metrics consumer is configured to run the saved query, and wherein the program instructions that, when executed by at least one processor, cause the computing platform to cause the saved query to be modified in accordance with the determined strategy for reducing the cardinality level of the saved query comprise program instructions that, when executed by at least one processor, cause the computing platform to:

instruct the given metrics consumer to modify the saved query so that the expression of the saved query encodes the request to fetch metric data for the composite metric.

20. A method implemented by a computing platform, the method comprising:

performing an analysis of a saved query comprising an expression that specifies a set of one or more metrics for which metric data is to be fetched from a metrics management platform when the saved query is run;

based at least in part on the analysis of the saved query, determining a strategy for reducing a cardinality level of the saved query that involves modifying the expression of the saved query by modifying the specified set of one or more metrics for which metric data is to be fetched when the saved query is run so as to reduce an extent of samples that are to be fetched during each run of the saved query; and causing the saved query to be modified in accordance with the determined strategy for reducing the cardinality level of the saved query.

* * * * *